(12) United States Patent
Horn et al.

(10) Patent No.: US 6,893,862 B1
(45) Date of Patent: May 17, 2005

(54) METHOD FOR PRODUCING DRUM AND PADDLE ASSEMBLY FOR ACCELERATED REMEDIATION

(75) Inventors: Terry Dean Horn, White Salmon, WA (US); Ronald Dean Horn, Vancouver, WA (US); Bradley S. Glaze, Lyons, OR (US); Kenneth R. Warner, Gladstone, OR (US)

(73) Assignee: H&H Eco Systems, Inc., North Bonneville, WA (US)

( * ) Notice: Subject to any disclaimer, the term of this patent is extended or adjusted under 35 U.S.C. 154(b) by 22 days.

(21) Appl. No.: 10/310,426

(22) Filed: Dec. 4, 2002

Related U.S. Application Data

(62) Division of application No. 09/943,725, filed on Aug. 30, 2001, now Pat. No. 6,541,241, which is a continuation of application No. 09/197,079, filed on Nov. 20, 1998, now Pat. No. 6,306,641, which is a continuation-in-part of application No. 08/782,410, filed on Jan. 14, 1997, now Pat. No. 5,854,061, which is a continuation-in-part of application No. 08/685,116, filed on Jul. 23, 1996, now Pat. No. 5,824,541, which is a continuation-in-part of application No. 08/223,523, filed on Apr. 5, 1994, now Pat. No. 5,593,888, which is a continuation-in-part of application No. 08/043,666, filed on Apr. 6, 1993, now abandoned, which is a division of application No. 07/918,528, filed on Jul. 21, 1992, now abandoned.

(51) Int. Cl.[7] .............................. B09B 3/00; C12M 1/00; C12N 1/00; C12N 1/20
(52) U.S. Cl. .................. 435/283.1; 435/243; 435/262.5
(58) Field of Search ............................ 435/243, 262.5, 435/283.1

(56) References Cited

U.S. PATENT DOCUMENTS

| | | |
|---|---|---|
| 3,128,729 A | 4/1964 | Henson |
| 3,369,797 A | 2/1968 | Cobey |
| 3,400,527 A | 9/1968 | Woodring |
| 3,776,528 A | 12/1973 | Toto |
| 3,815,823 A | 6/1974 | Johnson |
| 3,845,939 A | 11/1974 | Waldenville |
| 3,856,276 A | 12/1974 | Pannell |
| 3,881,707 A | 5/1975 | Toto |
| 4,019,723 A | 4/1977 | Urbanczyk |
| 4,104,048 A | 8/1978 | Urbanczyk |
| 4,209,335 A | 6/1980 | Katayama et al. |
| 4,306,686 A | 12/1981 | Urbanczyk |
| 4,360,065 A | 11/1982 | Jenison et al. |
| 4,397,674 A | 8/1983 | Laughbaum |
| 4,478,520 A | 10/1984 | Cobey |
| 4,554,002 A | 11/1985 | Nicholson |
| 4,850,745 A | 7/1989 | Hater |
| 4,881,690 A | 11/1989 | Maier |
| 4,951,883 A | 8/1990 | Loppoli |
| 4,960,247 A | 10/1990 | Lundell |
| 5,000,852 A | 3/1991 | Tel-or et al. |
| 5,098,481 A | 3/1992 | Monlux |
| 5,127,589 A | 7/1992 | Willibald |
| 5,199,212 A | 4/1993 | Newcomb |
| 5,228,804 A | 7/1993 | Balch |
| 5,295,761 A | 3/1994 | Heacock |
| 5,304,710 A | 4/1994 | Kigel et al. |
| 5,733,067 A | 3/1998 | Hunt |
| 6,039,882 A | 3/2000 | Wolfe et al. |

*Primary Examiner*—David M. Naff
*Assistant Examiner*—Deborah K. Ware
(74) *Attorney, Agent, or Firm*—Marger Johnson & McCollom, P.C.

(57) ABSTRACT

This invention relates to a method of producing a drum and paddle assembly for the accelerated remediation of a contaminated material. The method comprises providing at least one paddle which is connectable to, and extendable outwardly from the periphery of, an elongate cylindrical drum. The drum has a longitudinal axis and generates an air stream at a velocity sufficient for entraining the contaminated material therein. Also, it is employed for microenfractionating the contaminated material so that the contaminated material is treated with at least one chemical amendment prior to, and/or during, and/or subsequent to, microenfractionating the contaminated material. Each of the paddles comprises a body having a first planar portion having a leading edge and a second planar portion connected at a first angle to the first paddle portion. The second planar portion is oriented so as to generate a first material-entraining air stream when the drum is rotated, and a base portion connected to the body for mounting the paddle onto the drum. At least one the paddle is mounted onto the drum.

20 Claims, 24 Drawing Sheets

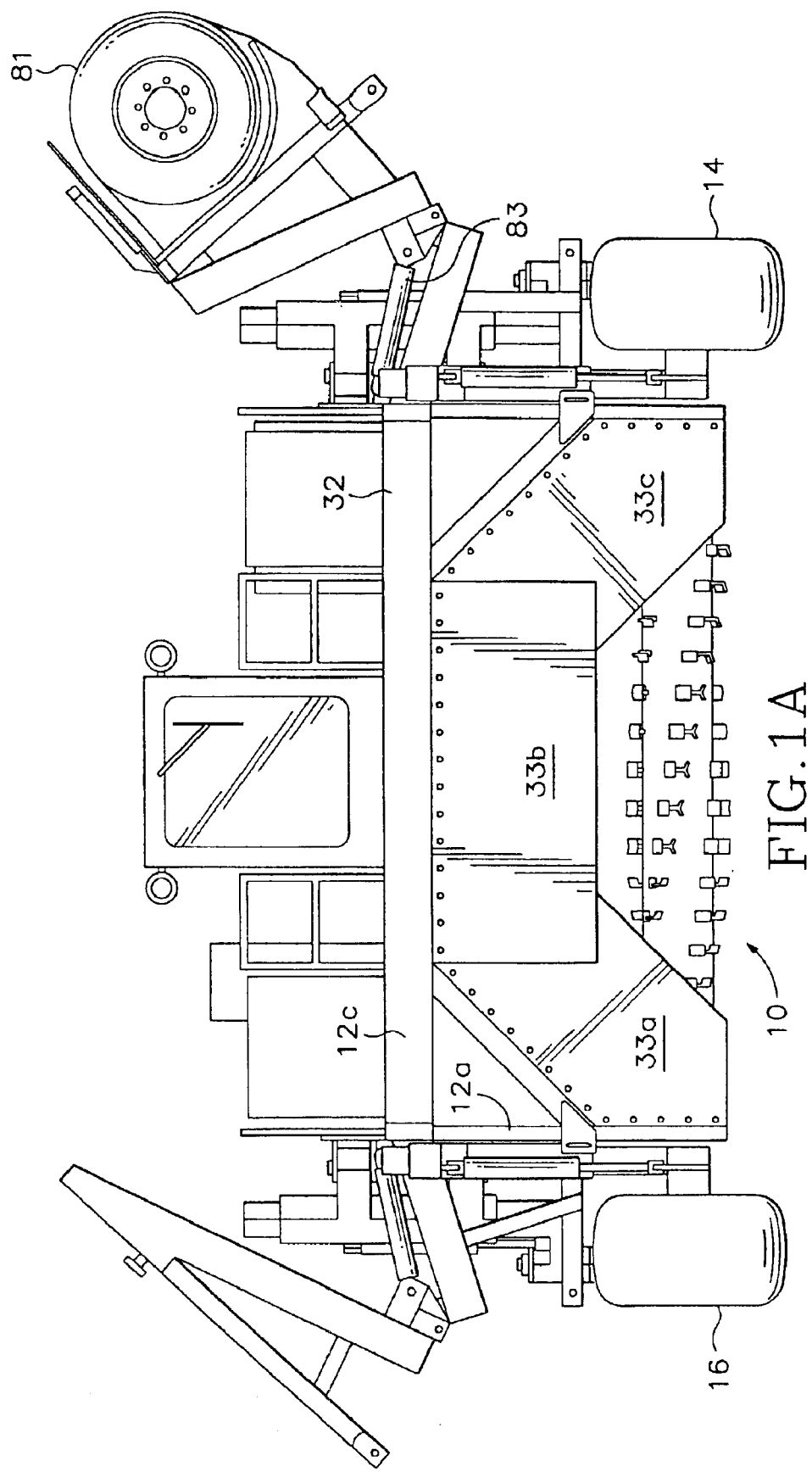

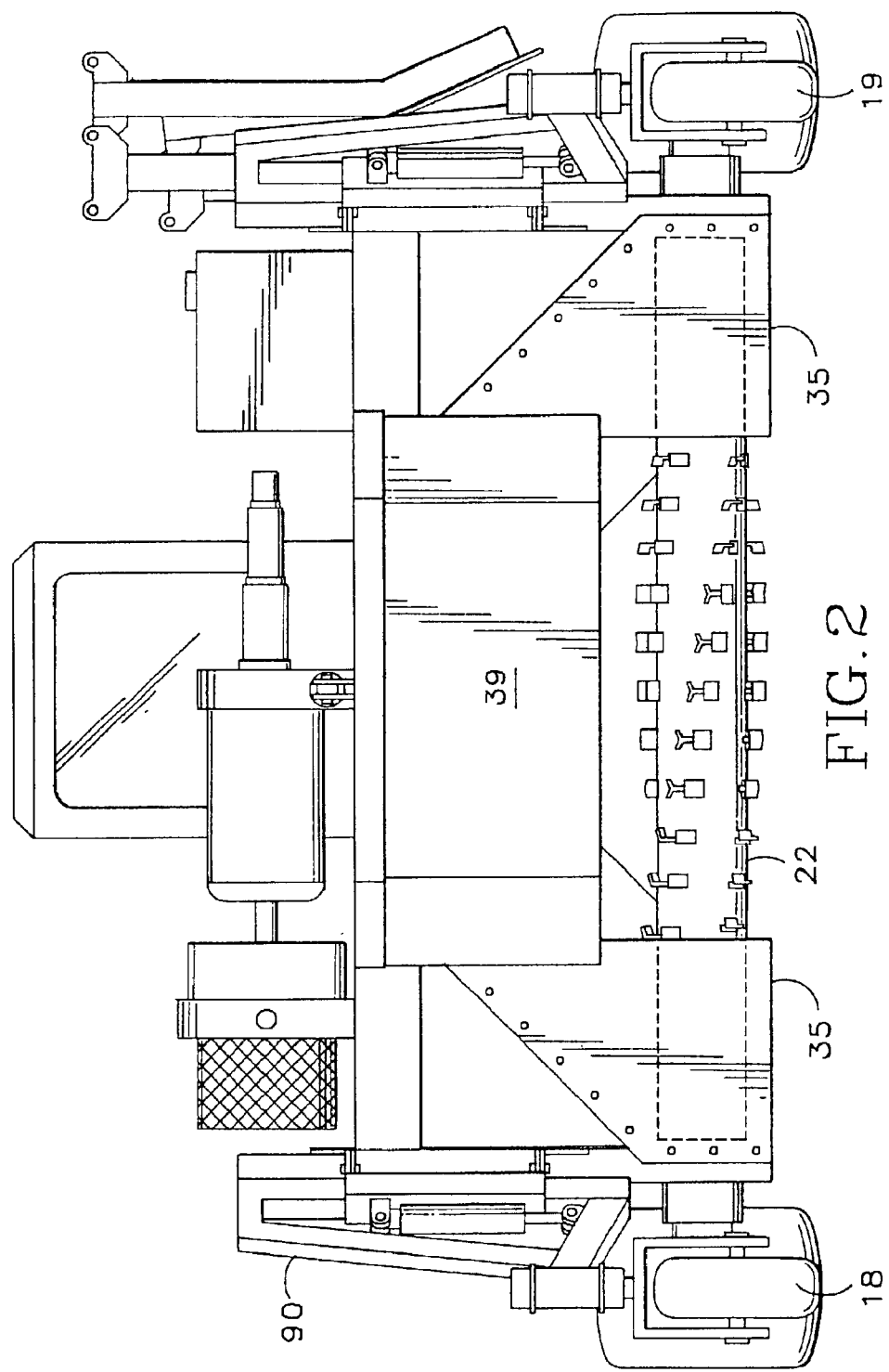

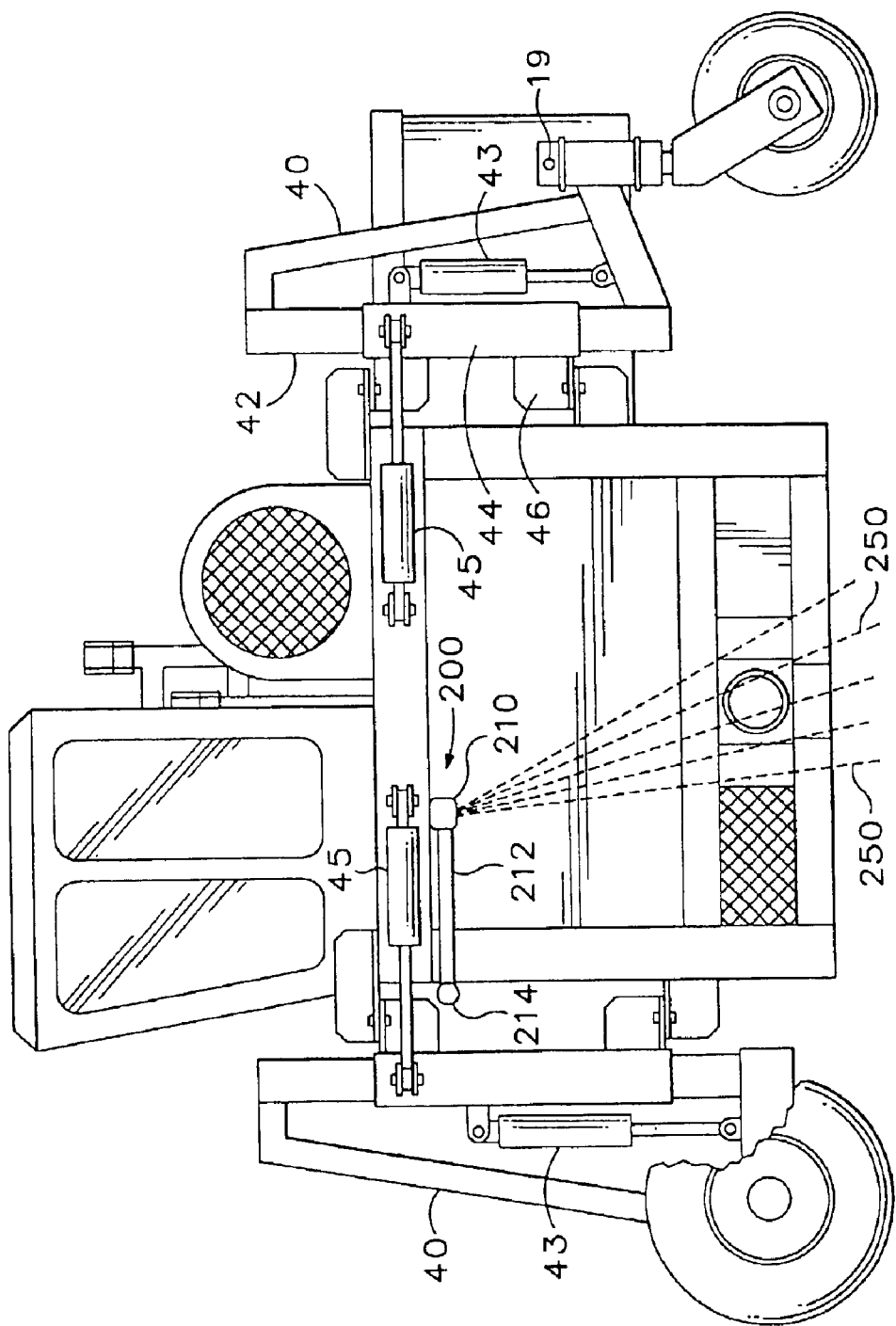

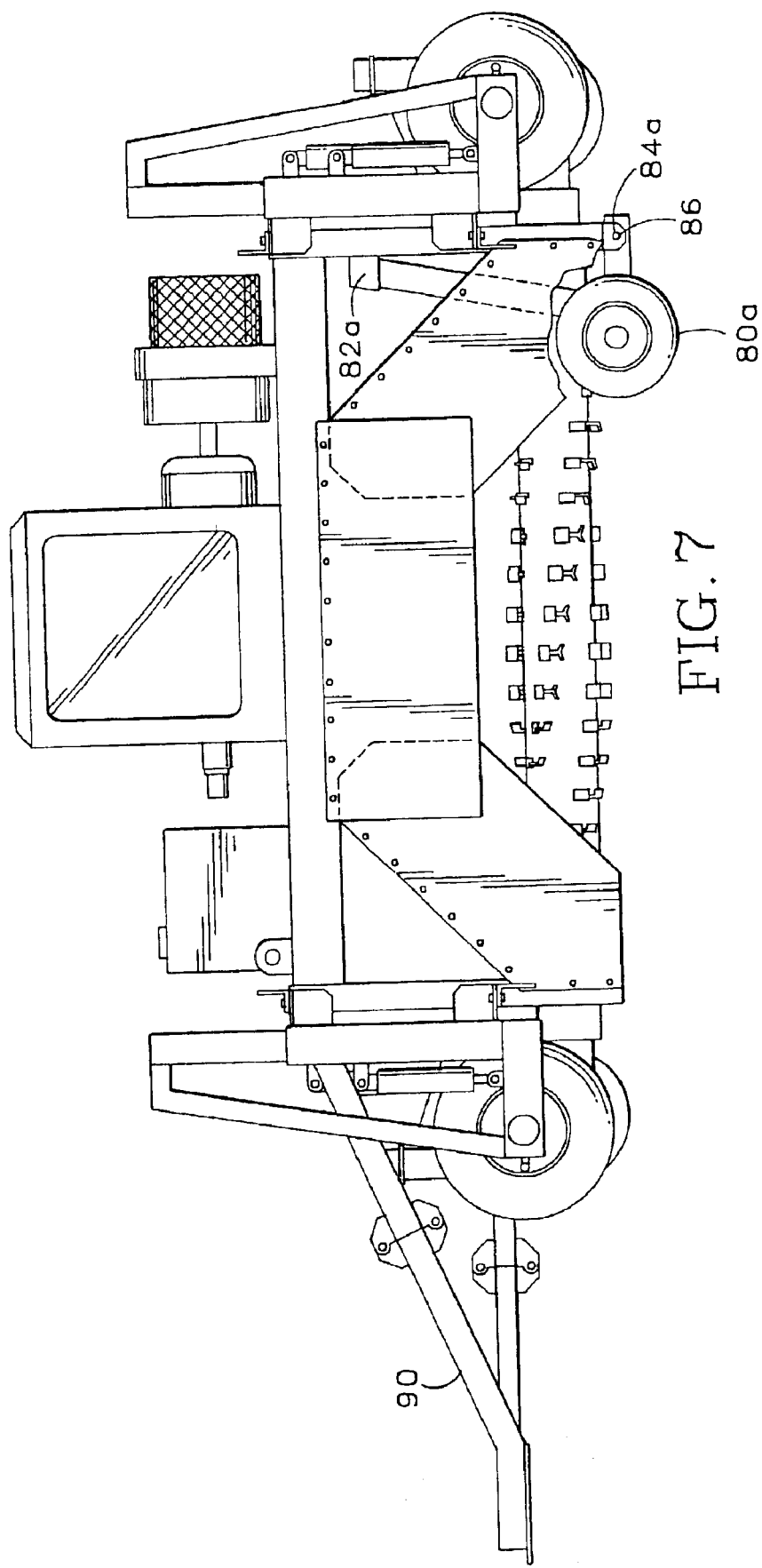

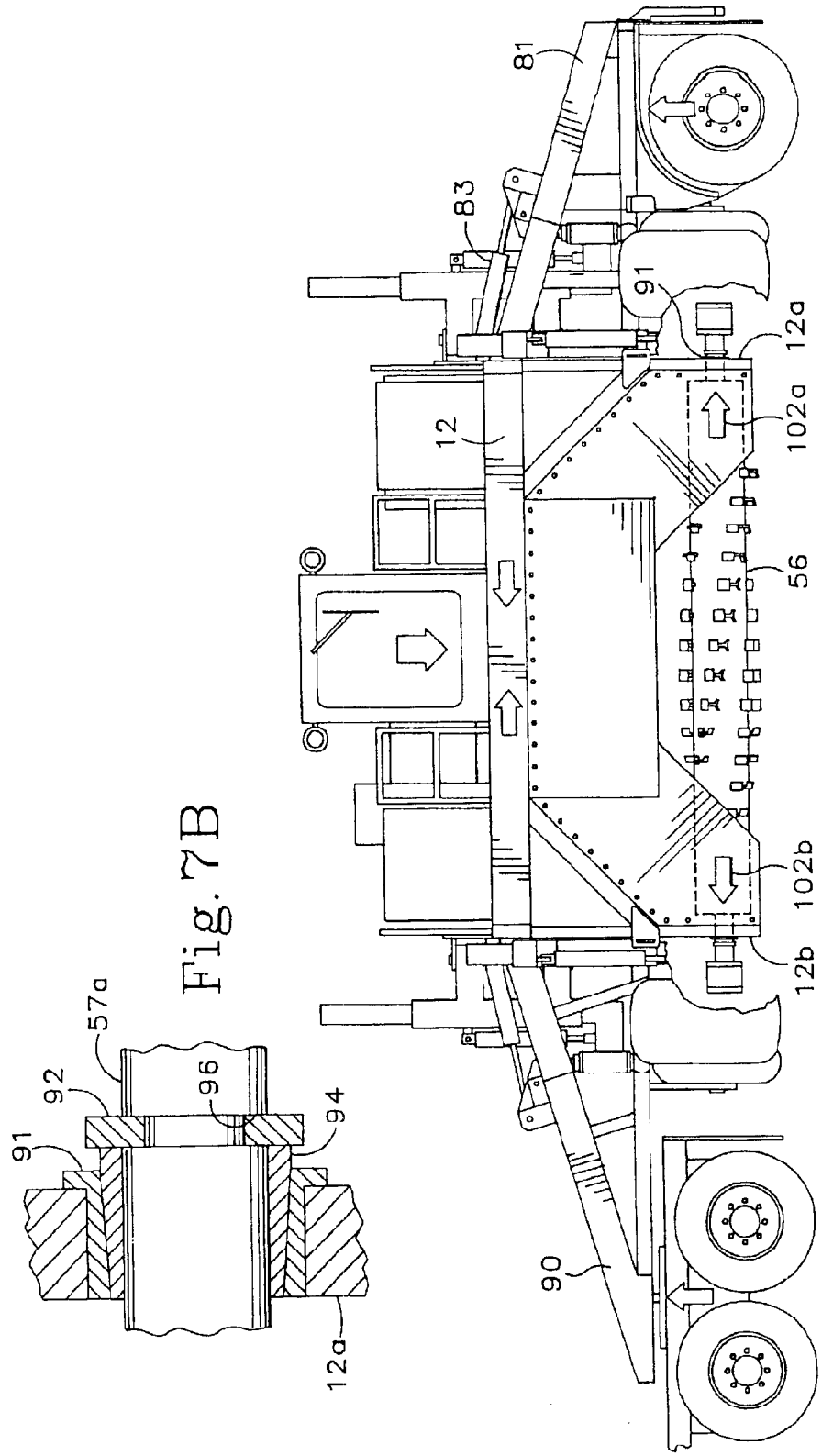

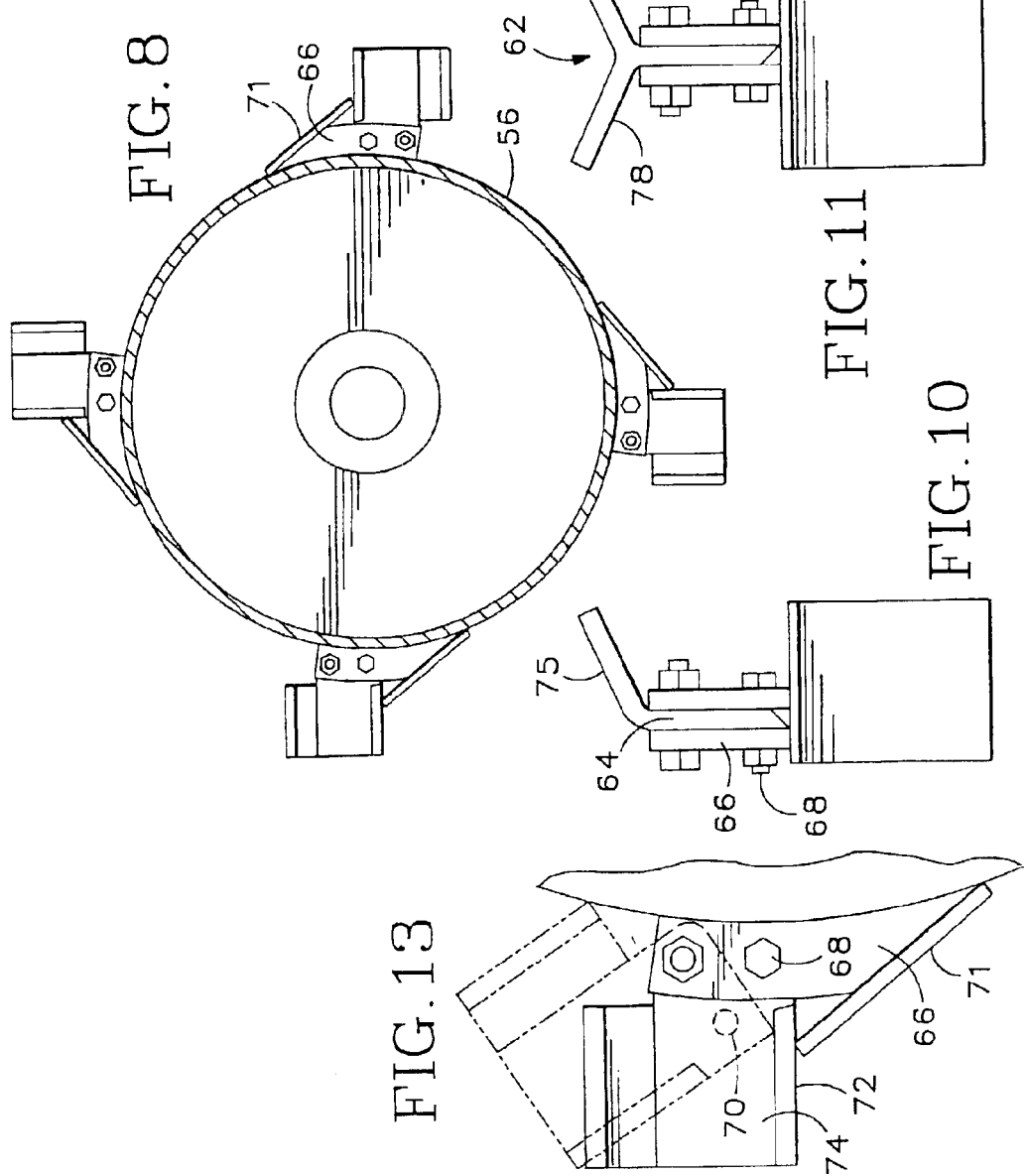

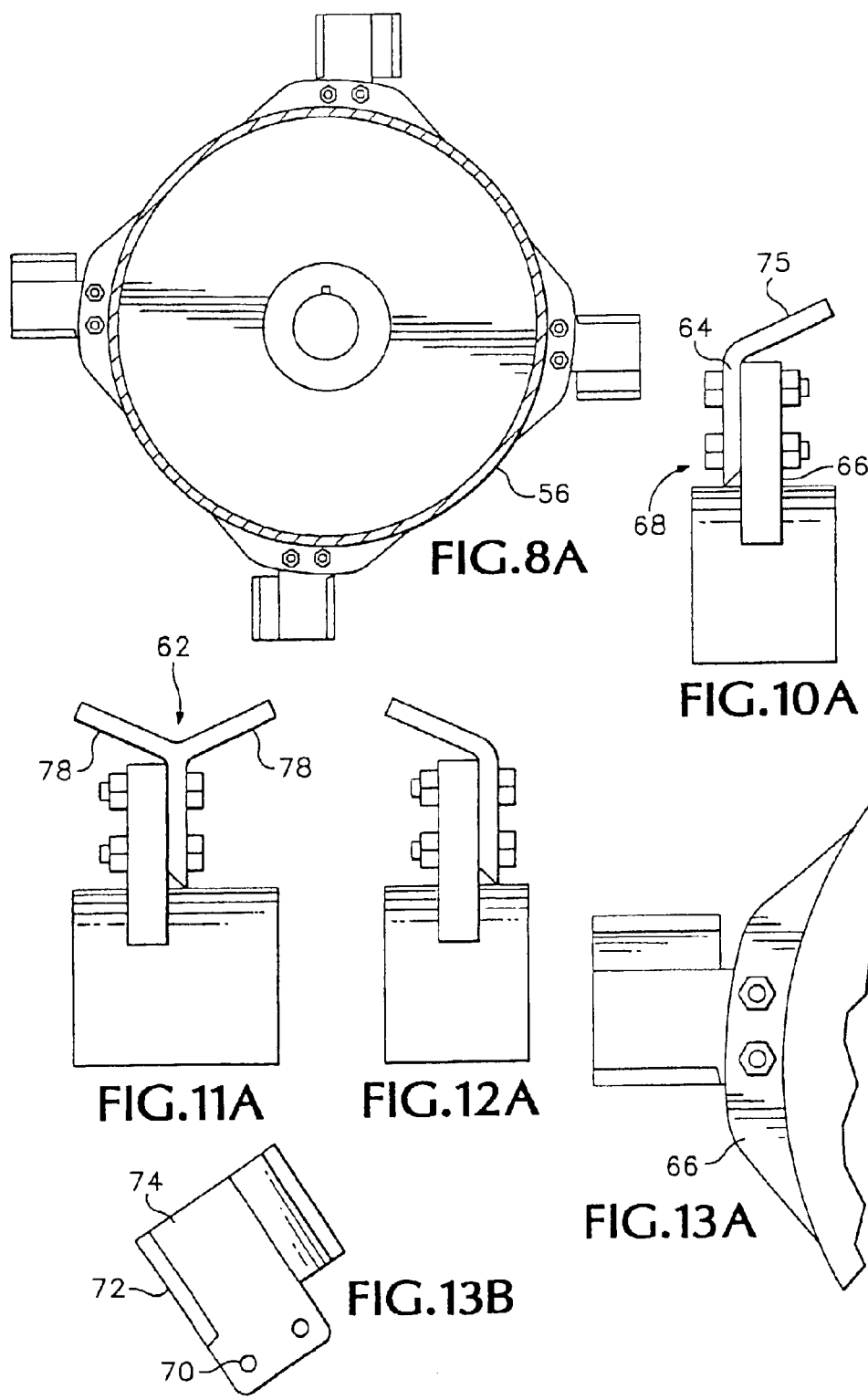

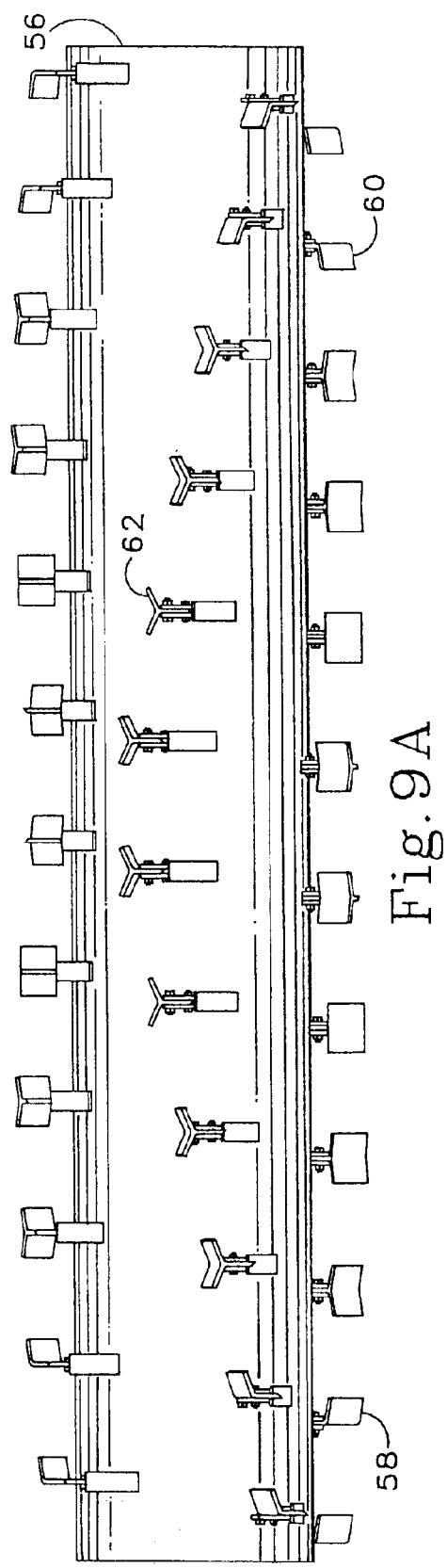

METHOD FOR PRODUCING DRUM AND PADDLE ASSEMBLY FOR ACCELERATED REMEDIATION

RELATED APPLICATION

This is a divisional application of U.S. Ser. No. 09/943,725, filed Aug. 30, 2001, now U.S. Pat. No. 6,541,241; which is a continuation application of U.S. Ser. No. 09/197,079, filed Nov. 20, 1998 now U.S. Pat. No. 6,306,641, which is a continuation-in-part application of U.S. Ser. No. 08/782,410, filed Jan. 14, 1997 now U.S. Pat. No. 5,854,061, which is a continuation-in-part application of U.S. Ser. No. 08/685,116, filed Jul. 23, 1996 now U.S. Pat. No. 5,824,541, which is a continuation-in-part application of U.S. Ser. No. 08/223,523, filed Apr. 5, 1994 now U.S. Pat. No. 5,593,888, which is a continuation-in-part application of U.S. Ser. No. 08/043,666, filed Apr. 6, 1993 now abandoned, which is a divisional application of U.S. Ser. No. 07/918,528, filed Jul. 21, 1992 now abandoned.

BACKGROUND OF THE INVENTION

The present invention relates to a method for the accelerated remediation of contaminated material and to a method of using a paddle therefor, and more particularly to a paddle connectable to, and extending outwardly from the periphery of, an elongate cylindrical drum. Remediation typically involves the degradation of contaminated material using chemical amendments.

Bioremediation in general involves the degradation of contaminated material, typically by the action of contaminate degrading aerobic bacteria. When practiced on a small scale, it is relatively easy to maintain the aerobic conditions required by the bacteria; it is much more difficult to do on a larger scale. Failure to maintain aerobic conditions throughout the contaminate material results in anaerobic decay of the material, which is much less efficient and much more time consuming than aerobic decomposition. This provides strong incentive to maintain aerobic reaction conditions at all times.

The biological degradation of hydrocarbons can be conducted employing specialized bacteria that utilizes hydrocarbons as their sole metabolic carbon source or as a co-metabolite. The bacteria produce enzymes, which catalytically crack the covalent carbon-hydrogen bonds of hydrocarbons so that the smaller resulting molecules may pass through the cell wall of the bacterial organism for nutrient. In some instances, the bacteria may produce enzymes, which crack a carbon bond on an alternate carbon source such as a carbohydrate. This same enzyme may also crack the hydrocarbon. This is called co-metabolism.

In addition to a carbon source, most living organisms require a balance of other nutrients such as nitrogen, phosphorus, various minerals in micro quantities, etc. to efficiently metabolize and reproduce. Any specific nutrient that is deficient in a given biological system will limit the efficiency of that system. This is akin to the "basic 4 food groups" idea of human nutrition which includes protein as a nitrogen source, carbohydrate as a carbon source, dairy as a fat or fatty acid source plus phosphorus and a large number of vegetables as a vitamin and mineral source. Although bacterial requirements may be different from humans, a balanced nutritional system is required for optimal bacterial activity.

There are thousands of identified sites in the United States containing, hazardous wastes. For most of these sites, the recognized methods for closure are:

1. Cap and store-in-place
2. Removal to an approved hazardous waste landfill.
3. Solidify in place with fixation chemicals In addition to the methods generally known, many industrial plants have used biological solutions to effect closures. Quite a few biological cleanups took place prior to the effect of the RCRA and TSCA legislation. Now under the formal guidelines of current hazardous waste regulation, use of biological treatment can offer an economical alternative to the methods listed above.

Biological treatment of hazardous waste chemicals can take the following forms:

1. Treatment of industrial wastewater through biological oxidation and/or reduction under an NPDES permit.
2. Treatment of on site chemicals through controlled release to an NPDES-permitted system (many states allow this through a temporary permit amendment).
3. Treatment of leachates collected under hazardous waste sites. In some cases a cone of depression can be created to leach organics out at a rapid rate.
4. Land farm of sludges and solid-containing organics. Land farming is of principle interest due to the large numbers of area sites with contaminated sludges and soils.

A key issue in a hazardous waste site closure is permitting land farms. Often obtaining such a permit is not feasible under existing regulations. In most cases, those regulations were intended to address new land farms. Land farming is a biochemical process which operates at low biological reaction rates. The variables controlling total cleanup time in a land farm are initial substrate concentrations, desired treatment levels, area available for land farm and turnaround time to dispose of decontaminated sludge or soil. Many hazardous waste sites could be successfully land farmed in 6–12 months, after pilot work is complete.

The actual protocol for remediating a particular site should be established for each site by a combination of pilot testing and practice. A typical protocol for remediating a hazardous waste site would be as follows:

1. CHARACTERIZATION OF THE SITE
    This includes additional soil borings, groundwater monitoring and chemical analyses to determine the site contamination characteristics.
2. CHARACTERIZATION OF THE ORGANICS AS TO BIODEGRADABILITY
    This is usually researched into the treatability of chemicals found in the site.
3. CHARACTERIZATION OF THE SOIL
    The soil must be analyzed for pH, macronutrients (N,P,K), micronutrients (usually trace metals), permeability, moisture content and other conditions which will determine its suitability for land farming.
4. CRITERIA FOR SUCCESSFUL LAND TREATMENT
    A chemical protocol is established to allow monitoring of the land farm. This is a two-tier protocol consisting of:
        A. Control analyses to allow quick determination of treatment progress during the land farming.
        B. Objective toxicity testing to be used when control analyses indicates that the treatment is complete. This includes all testing for leachate priority pollutants.
5. BENCH SCALE LAND FARM TREATMENT
    Using the site characteristics, the land farm is simulated and efficiency of the treatment is proven. Samples of decontaminated soil and sludge may be presented for reference analyses.

6. DESIGN OF LAND FARM TREATMENT

The consultant and land farm specialists designate the portion of the closure site to be used for the land farm and design excavation schedules, aeration and mixing techniques, irrigation method, runoff collection, and decontaminated soil removal and disposal method.

7. IMPLEMENTATION OF LAND FARM TREATMENT

Beginning with a surface treatment of the site to be used, the land farm is begun. After control testing shows a desired level of treatment, toxicology tests are made. The soil may then be decontaminated and removed, if desired. Land farming is then usually continued in 12" lifts.

8. CLOSURE

Decontaminated sludges and soils are removed to a nonhazardous waste landfill or landfilled on-site.

The above steps are difficult and timely in their performance. They are also extremely costly to perform for the end user.

There are known machines for physically mixing materials in the field such as compost to maintain aerobic conditions. An example is U.S. Pat. No. 4,360,065 to Jenison et al. The Jenison cultivator comprises a horizontal rotating drum having a plurality of cultivator blades in two helical rows. As the drum is rotated, the blades travel edgewise through a pile of contaminated material to move the material sideways and pile it in a generally triangular pile. The '065 patent further describes other contaminated machines such as the Scarab, sold by Scarab Manufacturing and Leasing, Inc. of White Deer, Tex. U.S. Pat. No. 3,369,797 to Cobey describes a compost turner and windrow forming machine having a transversely mounted rotating drum for the turning of compost piles and the redepositing of the turned up material in a windrow. Yet another contaminated apparatus is described in U.S. Pat. No. 4,019,723 to Urbanczyk. The '723 patent describes a mobile apparatus for manure which moves a rotating drum over masses of inoculated manure to flail it, mix it, cool it and aerate it, while moistening the particles as the same time. After being conditioned and moisturized, the material is formed into a pile by a rear outlet opening. As with the Cobey apparatus, the flails mounted on the drum of the Urbanczyk machine travel edgewise through the contaminated material for flailing and mixing. U.S. Pat. No. 4,478,520 also to Cobey describes a compost turning machine which straddles a compost windrow while carrying a rotating drum for turning the contaminated material. The '520 apparatus additionally has an adjuster auger system outboard of the rotating drum to collect additional material and deposit it in the path of the rotating drum. This is the Cobey machine referred to earlier.

A need therefore exists for a method of remediation which will overcome the problems associated with the above described prior art methods by substantially eliminating the contaminants from contaminated material in an effective, efficient and accelerated manner.

SUMMARY OF THE INVENTION

Applicants have met the above-described existing needs and have overcome the above-described prior art problems through the invention set forth herein.

In one form of the invention, a method of using an apparatus is provided for the accelerated remediation of treated contaminated material. Treating of the contaminated material with at least one chemical amendment, with or without at least one biological amendment, can occur prior to, and/or during, and/or subsequent to, microenfractionating of the contaminated material. The chemical amendment can be at least one chemical reducing agent with or without at least one chemical oxidizing agent. For example, a contaminated material can be treated with at least one chemical amendment comprising a chemical reducing and/or oxidizing agent to form a treated contaminated material prior to microenfractionation of thereof. Then, an air stream is generated at a velocity sufficient for entraining the treated contaminated material therein, and the treated contaminated material is entrained in the air stream, and the treated contaminated material is microenfractionated under conditions sufficient to form a microenfractionated treated contaminated material such that subsequent accelerated remediation is provided under conditions sufficient for conducting said accelerated remediation. Alternatively, the chemical amendment(s) can be added during, or subsequent to, microenfractionating of the contaminated material. In any of the above-described methods, the accelerated remediation of the treated contaminated material can be facilitated.

The chemical amendment can also comprise at least one chemical reducing agent which is in the form of a liquid or a solid, preferably an aqueous solution, which is capable of acting as a chemical reducing agent for remediation or bioremediation purposes, particularly in the microenfractionation of contaminated materials of the present invention. These types of chemical amendments are particularly useful in the dehalogenation of halogenated hydrocarbons such as the difficult to remediate chlorinated hydrocarbons.

The chemical amendment of this invention can comprise a chemical reducing agent. Preferably, the chemical reducing agent comprises a metallic reducing agent. Preferably, the metallic reducing agent comprises a zero valent metallic compound. More preferably, the metallic reducing agent is a zero valent metallic compound comprising iron, zinc, tin, aluminum, manganese or other similar zero valent metallic compounds. Most preferably, the chemical reducing agent comprises a zero valent iron compound.

An activating agent can also be added to the chemical reducing agent to make the remediation with the chemical reducing agent more effective and/or efficient. Such activating agents are typically acidic activating agents, preferably organic acid acidic activating agents such as acetic acid, or inorganic acidic materials such as hydrochloric acid, phosphoric acid, or nitric acid. Other acidic activating agents may include aliphatic alpha-hydroxycarboxylic acids of the type RCHOHCOOH and the corresponding beta-hydroxycarboxylic acids $RCHOHCH_2COOH$, complexing agents such as ethylenediaminetetraacetic acid (EDTA), nitrolotriacetic acid (NTA) and diethylenediamine-pentaacetic acid (DPTA) and amines, hydroxyl containing amines such as mono-, di- and triethanolamine and diamines, triamines, polyamines having complexing properties. Exemplary alpha- and beta-hydroxy carboxylic acids are glycolic acid, lactic acid, glyceric acid, α,β-dihydroxybutyric acid, α-hydroxy-butyric acid, α-hydroxy-isobutyric acid, α-hydroxy-n-valeric acid, α-hydroxy-isovaleric acid, β-hydroxy butyric acid, α-hydroxy-isobutyric acid, β-hydroxy-n-valeric acid, β-hydroxy isovaleric acid, erythronic acid, threonic acid, trihydroxy-isobutyric acid and saccharinic acids and aldonic acids, such as gluconic acid, galactoni acid, talonic acid, mannonic acid, arabonic acid, ribonic acid, xylonic acid, lyxonic acid, gulonic acid, idonic acid, altronic acid, allonic acid, ethenyl glycolic acid, and β-hydroxy-isocrotonic acid. Also useful are organic acids having two or more carboxylic groups, and no or from one to ten hydroxyle groups, such as oxalic acid, malonic acid, tartaric acid, malic acid, and citric acid, ethyl malonic acid, succinic acid, isosuccinic acid, glutaric acid, adipic acid, suberic acid, azelaic acid, maleic acid, fumaric acid, glutaconic acid, citramalic acid, trihydroxy glutaric acid, tetrahydroxy adipic acid, dihydroxy maleic acid, mucie acud, mannosaccharic acid, idosaccharic acid, talomucie acid, tricarballylic acid, aconitic acid, and dihydroxy tartaric acid.

The chemical amendment can also comprise at least one chemical oxidizing agent which is in the form of a liquid or a solid, preferably an aqueous solution. Preferably, the chemical oxidizing agent can comprise a peroxide, a permanganate, a nitrate, a nitrite, a peroxydisulfate, a perchlorate, a sulfate, chlorate, a hypochlorite, an iodate, a trioxide, a peroxybenzoic acid, an oxide, an iodic acid, a nitric acid, a periodic acid, a peracetic acid, a hydantoin, a triazinetrione, a hydroxide, a percarbonate, a superoxide, an isocyanate, an isocyanic acid, a bromanate, a biiodate, a bromate, a bromate-bromide, a molybdic acid, a dichromate, a chromate, a period ate, a chlorite, an iodate, or a perborate. More preferably, the chemical amendment can comprise any one of the following: aluminum nitrate, ammonium dichromate, ammonium nitrate, ammonium peroxydisulfate, ammonium permanganate, aquaquant sulfate, ammonium perchlorate, microquant sulfate, ammonium peroxydisulfate, spectroquant nitrate, barium bromate, barium chlorate, barium nitrate, barium perchlorate, barium permanganate, barium peroxide, cadmium nitrate, 1-bromo-3chloro-5,5 dimenthylhydantoin, bismuth nitrate, calcium hypochlorite, calcium iodate, calcium nitrate, ceric ammonium nitrate, ceric sulfate, calcium chlorate, calcium chlorite, calcium hypochlorite, calcium perchlorate, calcium permanganate, calcium peroxide, cerous nitrate, chloric acid, chromium trioxide, chromium nitrate, cobalt nitrate, copper chlorate, cupric nitrate, halane (1,3, dichloro-5,5dimenthylhydandoin),3-chloroperoxybenzoic acid, ferric nitrate, hydrogen peroxide, guanidine nitrate, iodic acid, lanthanum nitrate, lead dioxide, lead nitrate, lead oxide, lead perchlorate, lithium nitrate, lithium perchlorate, lithium hypochlorite, lithium chlorate, lithium peroxide lithium, perchlorate, magnesium bromate, magnesium chlorate, magnesium peroxide, magnesium nitrate, mercuric nitrate, mercurous nitrate, mercurous chlorate, manganese dioxide, mono(trichloro)-tetra-(monopotassium dichloro)-penta-$\alpha$-triazinetrione, magnesium perchlorate, nitric acid, nickel nitrate, mercurous nitrate, periodic acid, peracetic acid, perchloric acid solutions, Class II and III (depending upon centration), potassium peroxide, potassium superoxide, potassium biiodate, potassium bromate, potassium bromate-bromide, phosphomolybdic acid, phenylmercuric nitrate, potassium hydroxide, potassium iodate, potassium dichromate, potassium nitrate, potassium nitrite, potassium chromate, potassium dichloro-$\beta$-triazinetrione (potassium dichloroisocyanate), potassium dichromate, potassium chlorate, potassium percarbonate, potassium perchlorate, potassium periodate, potassium permanganate, potassium persulfate, silver peroxide, sodium bromate, sodium carbonate peroxide, sodium dichloro-$\beta$-triazinetrione (sodium dichloroisocyanate) silver nitrate, silver oxide, silver perchlorate, sodium chlorite, sodium chlorate, sodium nitrate, sodium iodate, sodium dichromate, sodium nitrate, sodium perborate, sodium perborate (anhydrous) sodium perchlorate, sodium percarbonate, sodium perchlorate monohydrate, sodium periodate, sodium nitrite, sodium persulfate, sodium permanganate, sodium peroxide, strontium nitrate, strontium perchlorate, strontium peroxide, thorium nitrate, trichloroisocyanic acid, zinc nitrate, thallic nitrate, uranyl nitrate, urea peroxide, yttrium nitrate, zinc bromanate, zinc chlorate, zinc permanganate, and zinc peroxide.

The contaminated material can comprise nitrated and/or chlorinated hydrocarbons including nitrated and/or chlorinated polycyclic materials, nitrated and/or chlorinated heterocyclic materials, and nitrated and/or chlorinated aliphatic materials. Exemplary contaminated compounds include chlorinated pesticides, TNT, and RDX.

Preferably, the accelerated remediation reaction is conducted aerobically or abiotically. The reaction can also be conducted methanogenically.

Generally, the means for generating a treated contaminated material entraining air stream at a predetermined velocity comprises an elongate drum having a longitudinal axis, first and second end portions, and a center portion. The drum is rotatable about its longitudinal axis at a predetermined rotational speed, and means extending outwardly from the drum are provided for generating the treated contaminated material entraining air stream. Preferably, the treated contaminated material entraining air stream comprises a plurality of air currents, and the air current generating means comprises a plurality of paddles extending outwardly from the cylindrical outer surface of the drum. Typically, each paddle comprises a base portion connected to the drum, and a blade portion. Each blade portion has a major surface oriented for generating at least one the air current having a sufficient velocity for entraining and transporting treated contaminated material upwardly of the rotating drum when the drum is rotated at the predetermined rotational velocity.

The treated contaminated material entraining air stream preferably comprises a plurality of intersecting air currents. Each of the intersecting air currents has a sufficient velocity for entraining and transporting a portion of the treated contaminated material upwardly of the air stream generating means. More specifically, the means for generating a plurality of intersecting air currents comprises a plurality of end paddles extending radially outwardly from the first and second end portions of the drum. Each end paddle can comprise a base portion connected to the drum and a blade portion. In this instance, the blade portion has a major surface oriented relative to the drum for generating an air current directed upwardly of the drum and transversely toward the center portion of the drum when the drum is rotated at the predetermined rotational speed. It also has a plurality of center paddles extending radially outwardly from the center portion of the cylindrical outer surface. Each center paddle comprises a base portion connected to the drum, and a blade portion having first and second major surfaces. The first and second major surfaces are oriented relative to the drum for generating an air current directed upwardly and rearwardly of, and transversely toward the first and second end portions of the drum respectively when the drum is rotated at the predetermined rotational speed. In use, the air currents generated by the end and center paddles intersect and combine to form the treated contaminated material entraining air stream for microenfractionating the treated contaminated material.

In a preferred embodiment, the treated contaminated material entraining air stream comprises a vortex-type air stream which transports the entrained treated contaminated material in a generally circular path. In this case, the end and center paddles can extend radially outwardly from the drum so that they are arranged in a plurality of helical longitudinal row. Also, the drum can further comprise first and second transition portions disposed between the center portion and the first and second end portions respectively. The first and second transition portions of the drums having a plurality of end paddles and a plurality of center paddles extending radially outwardly therefrom.

In another form of the invention, a method of accelerated remediation of treated contaminated material is provided. This method comprises the steps of (a) treating the treated contaminated material with chemical biological amendments for facilitating accelerated remediation thereof, (b) providing an entraining air stream having a sufficient velocity for entraining the treated contaminated material therein, (c) entraining the treated contaminated material in the air stream, (d) microenfractionating the treated contaminated material, and (e) discharging the microenfractionated treated contaminated material from the air stream so that the treated contaminated material will be acceleratedly remediated. The microenfractionating step preferably comprises homogenization and aeration of the treated contaminated material. The entraining air stream preferably comprises providing an entraining air stream including a plurality of upwardly and transversely flowing, intersecting air currents, and more preferably comprises a vortex-like entraining air stream. Typically, the step of providing an entraining air stream includes the step of rotating a drum assembly at a rotational speed sufficient for generating the entraining air stream. The drum assembly can include means for generating this plurality of intersecting air currents when the drum assembly is rotated.

In one preferred method, the treated contaminated material is contaminated with a hydrocarbon material, and the accelerated remediation of the treated contaminated material comprises accelerated chain scission of the hydrocarbon material. In another case, when the treated contaminated material is contaminated with hydrocarbon material, the accelerated remediation, typically employing chemical reduction. If the hydrocarbon contaminant is halogenated, a halogen will also be produced. A further instance is where the treated contaminated material is contaminated with hydrocarbon material, and the accelerated remediation comprises reduction of the total hydrocarbon material in the treated contaminated material.

In general, at least about 70%, preferably at least about 80%, more preferably at least about 90%, and most preferably at least about 95% of the accelerated remediation of the treated contaminated material is completed within 150 days, preferably within 120 days, more preferably within 90 days, and most preferably within 60 days. Moreover, the volume of treated contaminated material which is acceleratedly remediately treated by the method of the present invention is generally at least about 1500 cubic yards, preferably at least about 2000 cubic yards more preferably at least about 2500 cubic yards, most preferably at least about 3000 cubic yards, per day per apparatus. This is particularly significant in the case of chlorinated contaminates since most prior art systems cannot remediate these compounds even after years of trying to treat same.

The method of the subject invention produces high surface area treated contaminated microenfractionated material. The surface area of the treated contaminated non-microenfractionated material can be increased, after the microenfractionating step, as compared to the surface area of the treated contaminated non-microenfractionated material, by a factor of at least about $1\times10^6$, preferably at least about $2\times10^6$, more preferably at least about $3.5\times10^6$, and most preferably at least about $5\times10^6$. More specifically, the subject method can further include the step of discharging the microenfractionated treated contaminated material from the air stream and redistributing it throughout a soil matrix. In this manner, the surface area of the microenfractionated treated contaminated material is substantially increased. This is especially important when dealing with clay type soils.

Most prior art remediation processes cannot be conducted at ambient temperatures below 10 degrees C. However, when the method of the subject invention is employed, the aforementioned high degree of accelerated remediation can be maintained at an average ambient temperature which is not more than about 10 degrees C., preferably not more than about 7 degrees C., more preferably not more than about 3 degrees C., and most preferably not more than about 1 degree C.

One reason why the accelerated remediation of this invention can be conducted at the low ambient temperature conditions described in the preceding paragraph herein, is that the subject reaction is generates a more substantial amount of exothermic heat than known prior art remediation processes. Thus, the accelerated remediation is preferably conducted at an exothermic temperature measured within the contaminated material of at least about 5 degrees, and more preferably at least about 10 degrees, higher than an average ambient air temperatures of from about zero up to about 10 degrees C.

As for the treatment of the contaminated material with the chemical amendments, it is preferred that they are dispersed throughout the redistributed microenfractionated treated contaminated material thereby facilitating accelerated remediation.

Other preferred embodiments of the subject method include (a) locating an impervious undercover below the treated contaminated material prior to the microenfractionating step thereby preventing the chemical amendments from leaching into soil underlying the treated contaminated material, and (b) a cover over the microenfractionated treated contaminated material, the cover allowing substantial solar radiation to pass there through and into the microenfractionated treated contaminated material, thereby facilitating the accelerated remediation and preventing moisture from soaking the microenfractionated treated contaminated material and to prevent moisture evaporation from the microenfractionated treated contaminated material.

BRIEF DESCRIPTION OF THE DRAWINGS

FIG. 1 is a front view of the preferred apparatus for use in the present invention.

FIG. 1A shows a front view of an alternative embodiment of the present invention.

FIG. 1B schematically depicts an exemplary flow tank system 225.

FIG. 2 is a rear view of the apparatus of FIG. 1.

FIG. 2A shows a rear view of an alternative embodiment of the present invention.

FIG. 3 is a left side view of the apparatus of FIG. 1.

FIG. 3A is a left side view of another embodiment of the apparatus according to the present invention.

FIG. 4 is a right side view of the apparatus of FIG. 1.

FIG. 4A is a left side view of the apparatus according to the present invention as shown in FIGS. 1A and 2A.

FIG. 4B is an enlarged view of the pivoting rear wheel assembly in its extended position.

FIG. 5 is a top view of the apparatus of FIG. 1.

FIG. 7 is a front view of the apparatus of FIG. 1 configured for being towed sideways.

FIG. 7A is a front view of an apparatus shown in FIGS. 1A and 2A configured for being transported by towing.

FIG. 7B is an enlarged view of the drum shaft bearing assembly.

FIG. 8 is a right side cross-sectional view of the drum and paddle assembly according to the first embodiment of the present invention.

FIG. 8A is a right side cross-sectional view of the drum and paddle assembly according to a second embodiment of the present invention.

FIG. 9A is bottom view of an alternate drum and paddle assembly.

FIG. 10 is a top view of a right side paddle according to the first embodiment of the present invention.

FIG. 10A is a top view of a right side paddle according to the second embodiment of the present invention.

FIG. 11 is a top view of a center paddle according to the first embodiment of the present invention.

FIG. 11A is a top view of a center paddle according to the first embodiment of the second invention.

FIG. 12 is a top view of a left side paddle according to the first embodiment of the present invention.

FIG. 12A is a top view of a left side paddle according to the first embodiment of the second invention.

FIG. 13 is a side view of a right side paddle showing the shear pin feature, and showing the released paddle in phantom according to the first embodiment of the present invention.

FIG. 13A is a side view of a right side paddle showing the shear pin feature, and showing the released paddle in phantom according to the first embodiment of the second invention.

FIG. 13B is a enlarged fragmentary view of a paddle showing a cutting edge 72 formed on the leading edge of a paddle body 74.

DETAILED DESCRIPTION OF THE PREFERRED EMBODIMENT

Figure 1:
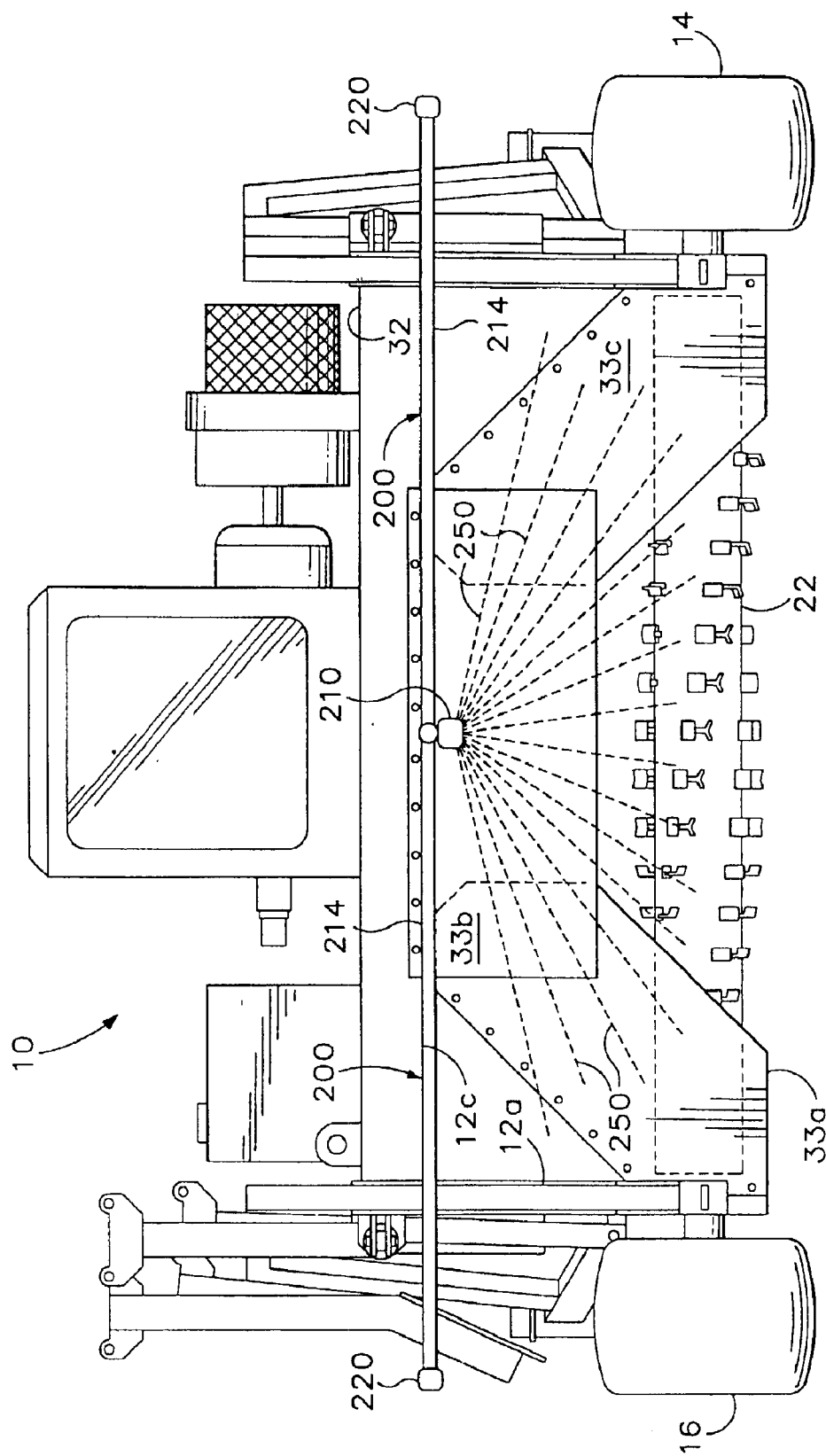

In the ex-situ method of this invention, the soil should be removed from the contaminated site and placed in windrows on top of durable liner which acts as an underliner in the subject accelerated remediation process. This underliner substantially prevents undesirable materials present in the ex-situ soil from leaching into the surrounding uncontaminated soil prior to the completion of the remediation process. It has been determined that a woven polyolefin fabric of the type exemplified by NOVA-THENE® RB616-6HD, manufactured by Polymer International (N.S.) Inc., of Truco Nova Scotia, Canada, is one of the most durable liners available for this purpose. One reason is that it will remain intact during the microenfractionation of the treated contaminated material by the hereinafter-described subject apparatus.

After the liner has been laid down in a pile (on as smooth a surface as possible), a layer of sand is applied over the liner. Windrows are typically spaced 6–8 feet apart. The windrows should be no wider than 16 feet and no higher than 6 feet. The above-described liner is extended out 4 feet past edge of pile with a berm of about eight inches to allow the microenfractionating equipment to straddle the pile. All rocks, chunks of concrete larger than two inches and other debris should be removed from contaminated soil prior to microenfractionation. Once the contaminated dirt has been windrowed, treatment with the chemical amendments can commence.

Soil Analysis Prior to Starting Treatment

First, the soil is analyzed for contaminant, and a full agricultural analysis is done. The testing for total petroleum hydrocarbons is not in itself an easy task. The type and quantity of contaminant must be accurately revealed. The contaminant reduction requirements must also be known. In addition, a series of soil tests must be undertaken. These tests include, but are not limited to, the following:

1. Total Petroleum Hydrocarbon Levels: The amount and nature of the hydrocarbon contaminants in the soil must be first determined. These include BTEX, PCP, PAH, PCB and the like. (EPA Test Nos. 418.1, 8015, 8020, 8270, etc.)

2. Standard 1/3 Bar Moisture Retention: The test will ascertain the quantity of water this soil will retain when placed under 1/3 bar vacuum. This is a standardized test to determine the saturation point of the soil with water. Knowing this will assist in determining the quantity of moisture that can be reasonably utilized during soil treatment.

3. pH: This test will determine if the soil is acidic, basic or neutral. Acidic pH is best for chemical oxidation degradation. If the soil is too basic (i.e. pH 8.0 or above), soil amendments will be necessary to make the soil pH more acidic.

4. Standard Buffer Capacity: This test will determine how much acid or base can be introduced into the soil before a pH change occurs. This information is useful because soil amendments can alter pH as can biological metabolyte materials produced during the biological treatment of petroleum hydrocarbon contaminated soil.

5. Standard Electrical Conductivity: Bacteria require a certain amount of electrical conductivity to survive and metabolize nutrients. If there is too little electrical conductivity or too much, the biological system can be inhibited or destroyed. Again, soil amendments can alter electrical conductivity if it becomes necessary.

6. Standard Sodium Absorption ratio (SAR): This test determines an estimate of the exchangeable sodium percentage of what a soil is, or what it is likely to become if the water that comprises the sample water is in that soil for long periods of time. The SAR has a good correlation to the exchangeable sodium percentage and is easier to calculate exactly (or to estimate from a few simple analysis) than is exchangeable sodium percentage. If the SAR exceeds 13, the biological system will be greatly impaired.

The purpose for the test is to determine if too much salt in the soil will inhibit biological activity by having sodium ions occupy a high proportion of exchange sites in the soil causing high pH and low water permeability. If this situation occurs, biological activity will slow or cease. Note that the use of inorganic nutrients can promote high salt content in soil due to the salt nature of inorganic nutrients. Organic based nutrients do not cause this to happen because they are not salt based.

7. Standard Organic Matter: Organic matter is required for any biological system to function properly. The organic matter can be a media of bacteria, it can supply nutrients in some cases, and it can be an indicator of biological activity. Knowing the organic matter level can help determine if additional organic matter is needed for soils treatment.

8. Standard Micro-nutrient Profile of the Soil: In addition to macronutrients, a micro-nutrient profile of the soil is very useful. Micro-nutrients are elements such as sulfur, copper, iron, zinc, boron, manganese, sodium, magnesium and calcium. All of these elements are necessary for microbial growth in very small quantities. If one or more of these nutrients are absent or unavailable, bacterial activity is inhibited. Conversely, if one or more micronutrients are excessive, this can also be inhibitory on bacterial growth. This must be known. The soil type of the contaminated soil must be ascertained, i.e. percentage of sand, silt, or clay. Each soil type must be treated differently. For instance, straight sand may not be capable of retaining moisture; clay or fine silt may require the addition of sand to assist in breaking the soil platelets apart, so that oxygen is not excluded from the system.

9. Redox Potential: This is a measure of the potential for a soil to oxidize or reduce introduced materials. More specifically, in soils, the redox potential determines the oxidation-reduction equilibrium as measured analytically using an electrode (usually a platinum electrode). This electrode potential will yield the oxidation states of iron and manganese in the soil as well as the sulfate/sulfide ratio, the nitrate activity, and other elements or compounds actively receiving or releasing electrons. The redox potential value is useful in estimating the quantities of oxidative and/or reductive chemicals required for remedial activity.

10. Contaminants: This includes the contaminant materials which typically pollute the soil including pesticides, insecticides, herbicides, dioxins, PAH compounds, and chlorinated hydrocarbons.

Ex-Situ Soil Treatment

Ex-situ treatment is the removal of contaminated material to a second site, and the remediation of thereof at that second site. In providing the second site, a berm is made typically from soil, straw or concrete ecology blocks. The width and length is dependent on the area available for use in remediation. First, the area contained by the berm is smoothed. It is then covered with the above-described underliner in order to create an impermeable barrier between the contaminated soil and the uncontaminated soil. Next, the underliner is covered with 2–4 inches of fine sand or pea gravel. Then, the windrows of contaminated soil 16 ft. wide and 6 ft. tall are laid out. Space must be left at sides and ends of berm for maneuvering the microenfractionating equipment. Finally, the entire windrow layout is covered with a translucent outdoor material which permits solar radiation to pass therethrough. The preferred material for this purpose is Loretex 1212 UV (clear), manufactured by Chave & Earley, Inc. of New York City, N.Y., a woven polyethylene substrate coated with polyethylene which is manufactured by The Loretex Corporation.

Treatment of Contaminated Materials

The soil is prepared by first adjusting the pH. In general, the soil pH is maintained in an acidic to neutral environment. Therefore, the pH of soil is preferably adjusted to between about 4.0 and 7.0, more preferably between about 4.5 and 6.5, and most preferably about 5.0, and is then treated with the chemical amendments.

Treatment Cell Construction

The treatment cell design of choice is a windrow configuration with the soil pile dimensions. For example, a windrow configuration conforming to 16 feet wide at the base, 5 feet wide at the top and a height of no more than 6.5 feet. Windrow length is limited only to available space at a given job site. The windrow should be placed on a level, smooth, firm surface. An underliner must be used and must be a continuous piece for surrounding environment protection.

After the underliner structure and windows are set up, the soil amendments-pH modifiers, chemical oxidizers and chemical reductants—may be added. The method for dispersion of soil amendment is preferably via broadcast spraying by the H&H Eco Systems spray unit or equivalent, or it is injected directly into microenfractionating chamber of the Microenfractionator™ during the course of its operation.

A one-piece top cover made from Loretex 1212 UV material is very resistant to damage from solar radiation. This material also transmits the maximum amount of solar radiation to the contaminated soil, thus assisting with elevated soil temperatures to assist the chemical reductive reaction. This property is very useful in promoting chemical activity during periods of low ambient air temperature.

Microenfractionation

Soil microenfractionation is one of the most critical aspects of soil remediation, such as chemical oxidative and/or reductive treatment of contaminated materials in general, and more particularly petroleum hydrocarbon contaminated soils. In the case of most petroleum hydrocarbon contaminated soil, for example, it is very unevenly contaminated or fractious in nature. The hydrocarbons will frequently form "globs" of contamination of high concentration in the soil. These "globs" repel water as well as maintaining a high enough concentration of petroleum hydrocarbon to inhibit complete chemical oxidation and/or reduction except at the contamination interface. The contamination interface will generally provide conditions favorable for chemical reaction with both available oxidants and/or reductants and relatively low hydrocarbon concentrations. The oxidative and/or reductive degradation rate is thus controlled by the active surface area of the hydrocarbon contaminant.

One conclusion that could be discerned from this is that, if the surface area of the hydrocarbon contaminant was increased, the rate of chemical oxidative and/or reductive reactivity would also increase. The apparatus used for that purpose in the subject invention very actively disperses the hydrocarbon contaminant throughout the soil matrix. The apparatus, known as the H & H Microenfractionator, is manufactured by Frontier Manufacturing Company and is capable of increasing surface area by a factor of at least about $1 \times 10^6$ with one two-way mixing pass. This same mixing action can disperse all of the soil amendments in the same manner. No other soil-mixing machine currently in use is capable of this type of mixing. The H & H Microenfractionator does not just "mix" the soil, it literally homogenizes and aerates it. With this corresponding increase in surface area, the remediation degradation rate, in this case oxidative and/or reductive remediation degradation rate, will increase by several thousand times. This process is defined, for purposes of this invention, as "microenfractionation".

After all additions are added, then the microenfractionation step can take place. For example, after application of pH modifiers and chemicals using a spray system such as the HH System 1000 sprayer, then an apparatus, such as the H & H Microenfractionator, can start its work. In order to achieve the maximum effect, the microenfractionating apparatus preferably must be passed through the soil matrix at least twice. The most efficient method is for the machine to pass through the soil in one direction, then, turn on its axis and pass through the soil in the opposite direction. This way the soil displacement (longitudinally) is essentially negated.

Stirring intervals for the contaminated soil will depend on the rate of remediation activity. If all of the treatment specifications are adhered to, a very rapid remediation rate will ensue. Additional/more frequent chemical requirements may be necessary depending on the soil analysis/testing done as the project progresses.

In the past, machines such rototillers, trackhoes, discs, and the like were used in remediation to "stir" contaminated soil. In the case of trackhoes, for example, this procedure was extremely time consuming, frequently taking all day to stir 500 cu. yards of soil. This factor alone greatly limited the economics of attempting a large remediation site. The soil handling would probably be cost prohibitive. While this method did a much better job of stirring than rototillers, it still did not address the stirring problem completely. Ideally the soil should be very thoroughly mixed with the soil amendments. The track hoe did not totally address this. It was also too costly as well as inadequate in aerating the soil. Extensive research was done to find soil mixing equipment that would adequately address all of the requirements for efficient biodegradation of hydrocarbons. A variety of rototillers, track hoe attachments, pug mills, batch mixers and shakers were researched. While some of the machines identified had merit, daily mixing volumes were limited. Also, all of the machines were inadequate in aeration.

The H & H Microenfractionator can mix remediation chemicals such as pH modifiers, chemical oxidants and/or reductants, other amendments with contaminated soil to form a treated microenfractionated material. Hydrocarbons will rarely contaminate soils in a uniform manner due to causes ranging from varying soil permeability to the water insoluble nature of hydrocarbons. Reducing the normally fractious nature of hydrocarbon contamination in soils is a task that this apparatus can accomplish very effectively. The mixing action simultaneously mixes the remediation chemicals and any other soil amendments with the hydrocarbon contaminated soil. This action brings the remediation chemicals and any soil amendments into direct contact with the contaminated soil to allow the most efficient remediation system. The HH System 614 also aerates the soil very thoroughly to keep the soil in an oxidated rather than a reduced state. It is also much faster—it can "microenfractionate" 500 cubic yards of soil per hour rather than "stir" the 1000 cubic yards per day that the track hoe is capable of doing. Other microenfractionators are the HH System 616 and 618 models.

Figure 2A:
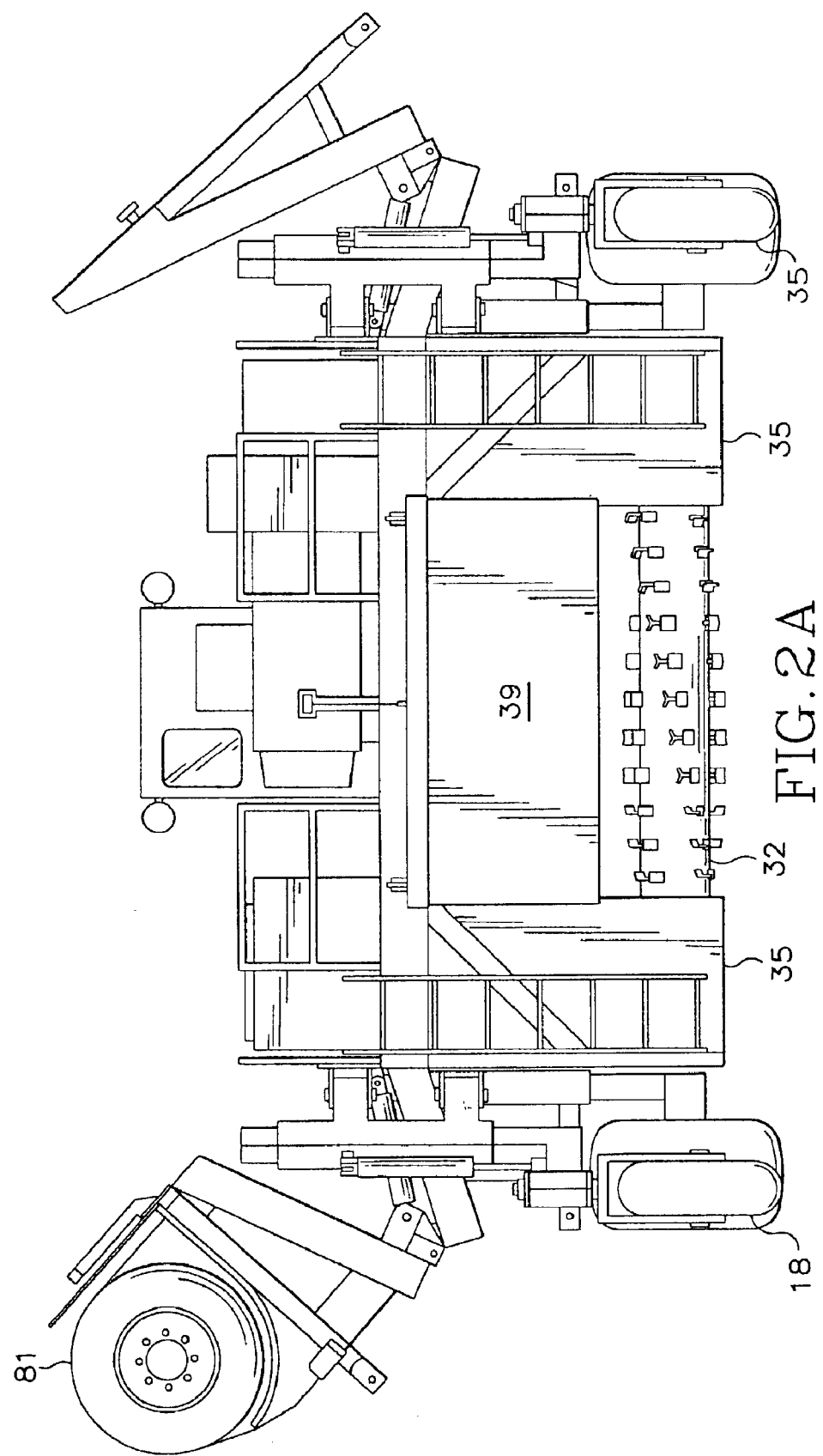

Referring now to FIGS. 1 and 2, a microenfractionating apparatus for use in the present invention is shown generally at 10. A second embodiment is shown in FIGS. 1A and 2A which differs in detail as described below.

Figure 3:
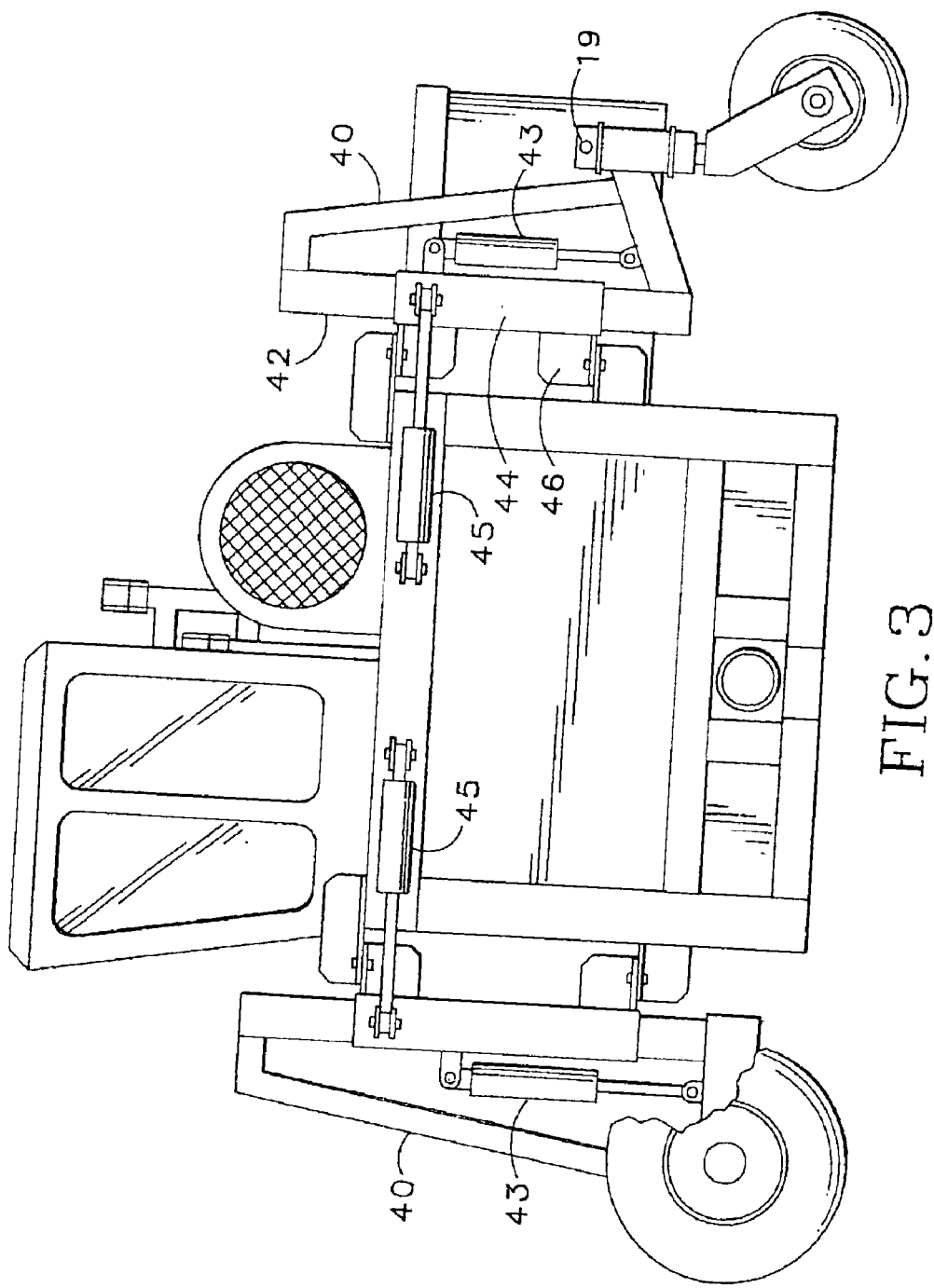

The apparatus 10 includes frame 12 which is assembled from ladder-type left, right, and top subframes, 12a, 12b and 12c respectively. Frame 12 is supported at its front end by left and right drive wheels 14 and 16, and at the rear by left and right caster wheels 18 and 19. Each wheel mounted on an axle which is journaled into a supporting frame assembly 40. Each rear caster wheel is mounted into its respective frame assembly 40 by a vertical shaft journaled into frame assembly 40 as shown in FIG. 3. Each rear caster wheel may be locked into a transverse position by locking pin assembly 19 when desired as described below. Each frame assembly 40 includes an upright member 42 slidably received within a complementary vertical sleeve 44 of a mounting assembly 46. Frame assembly 40 may thereby be raised or lowered relative to the ground on upright member 42 by actuation of hydraulic cylinder 43, allowing the ground clearance of apparatus 10 to be raised or lowered during operation as more fully described below. Mounting bracket 46 is in turn pivotally mounted on frame 12 at brackets 48, allowing each frame assembly 40 and wheel to be pivoted by actuation of hydraulic cylinder 45 for different modes of operation as described below.

Figure 1B:
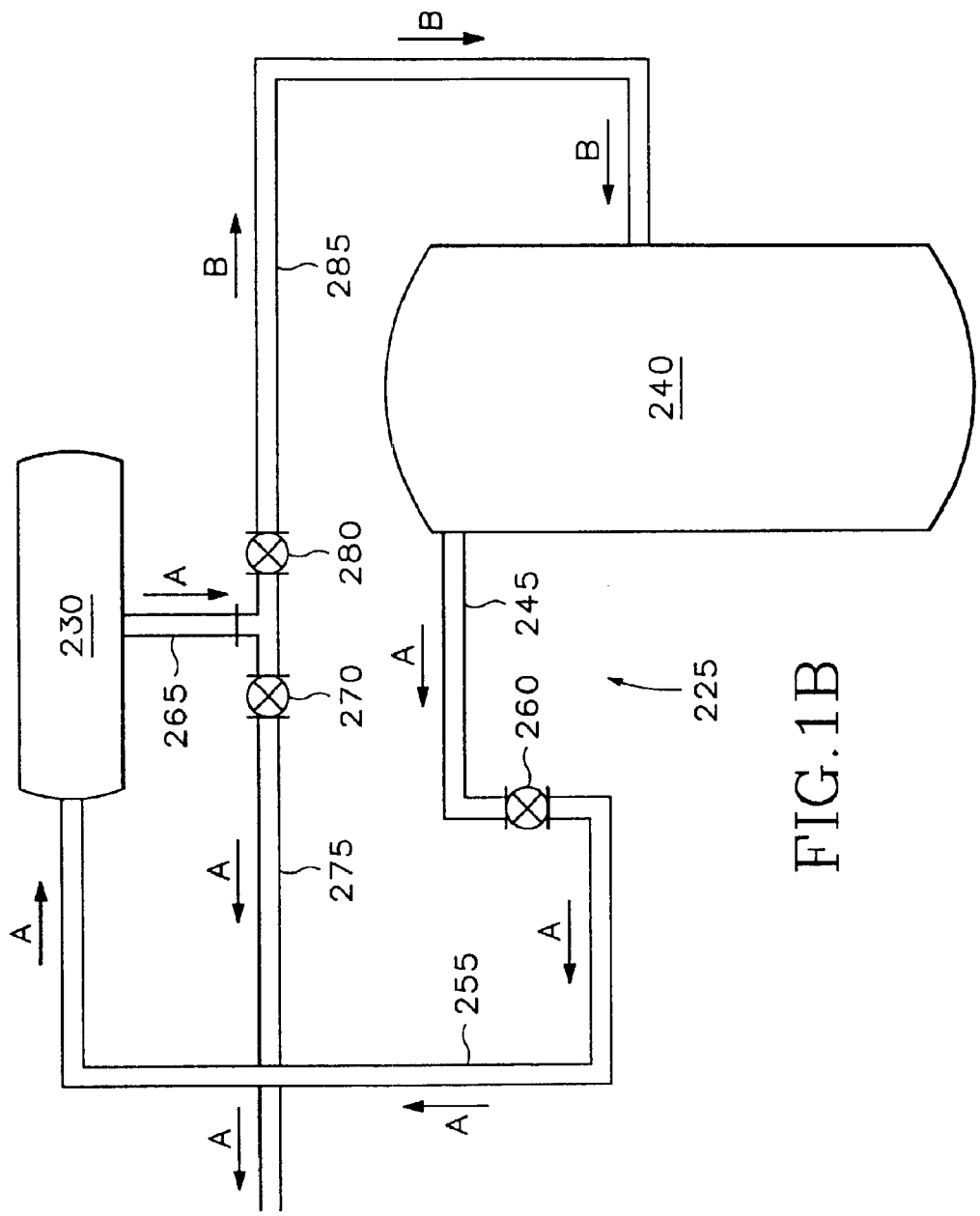

A spray system 200, as depicted in FIGS. 1 and 3A, is provided for discharging chemical amendments and/or biological amendments into the air stream generated by the apparatus 10 which contains the microenfractionated contaminated material. In this way, the contaminated material can be treated with the chemical amendments and/or biological amendments thereby facilitating said accelerated remediation. The spray system 200 comprises a transversely-extending flow pipe 214, which extends across the front of the apparatus 10, beyond the transverse extent of the apparatus 10. Vented ball valves 220, including quick-connect fittings, are connected at each end of pipe 214. A hose 275 (not shown) from a tank 240 (shown in FIG. 1B) containing chemical and/or biological amendments can be attached to either or both of the valves 220 for introducing the amendment(s) into the pipe 214, and then into the flow pipe 212 and nozzle 210 (see FIG. 3A).

Connected to the midpoint of flow pipe 214 is one end of a shorter flow pipe 212. Flow pipe 212 extends rearwardly at a right angle to the flow pipe 214. The other end of the flow pipe 214 is joined to a spray nozzle 210 which discharges a spray 250 of chemical amendments and/or biological amendments into the air stream generated by the apparatus 10.

One or more trailers (not shown) can be attached to the rear of apparatus 10. Each trailer has a flow tank system 225 mounted thereon for transferring the chemical amendment and/or biological amendment to the flow pipes 214 and 212, and in turn to the spray nozzle 210. An exemplary flow tank system 225, shown schematically in FIG. 1B, comprises a holding tank 240 for storing the chemical amendment and/or biological amendment. In order to transfer the chemical amendment and/or biological amendment to the spray nozzle 210 from holding tank 240, a pump 230 moves the amendment(s) from tank 240 (see arrows A), through flow pipes 245, 255, and 265, and then through hose 275 to valve 220, and onto spray nozzle 210. Hose 275 is connected to valve 220 by a quick connect fitting. Pump 230 can also transfer chemical amendment and/or biological amendment from pump 230 back to holding tank 240 (see arrows B). The path of chemical amendment and/or biological amendment from pipe 245 to pipe 255 is limited by vented check valve 260. The path of chemical amendment and/or biological amendment from pipe 265 to hose 275 is limited by vented check valve 265. Finally, the path of chemical amendment and/or biological amendment from pipe 265 to pipe 285 is limited by vented check valve 280.

In certain cases the chemical amendments and/or biological amendments have detrimental effect on the materials of construction of the apparatus 10. In these instances it is advisable to use a material of construction for the apparatus 10 such as stainless steel and thereby avoid these detrimental effects.

Figure 4:
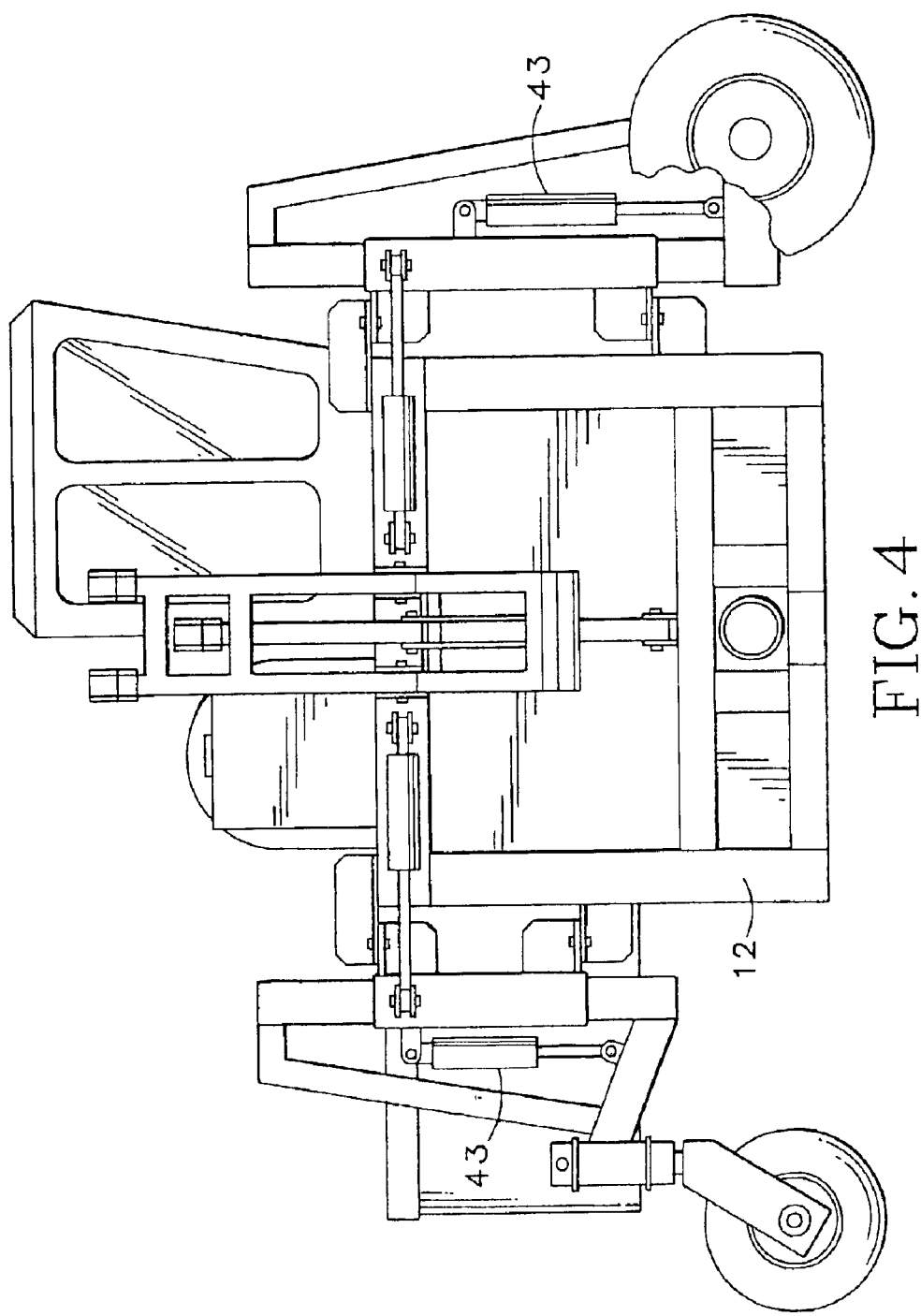
Figure 4A:
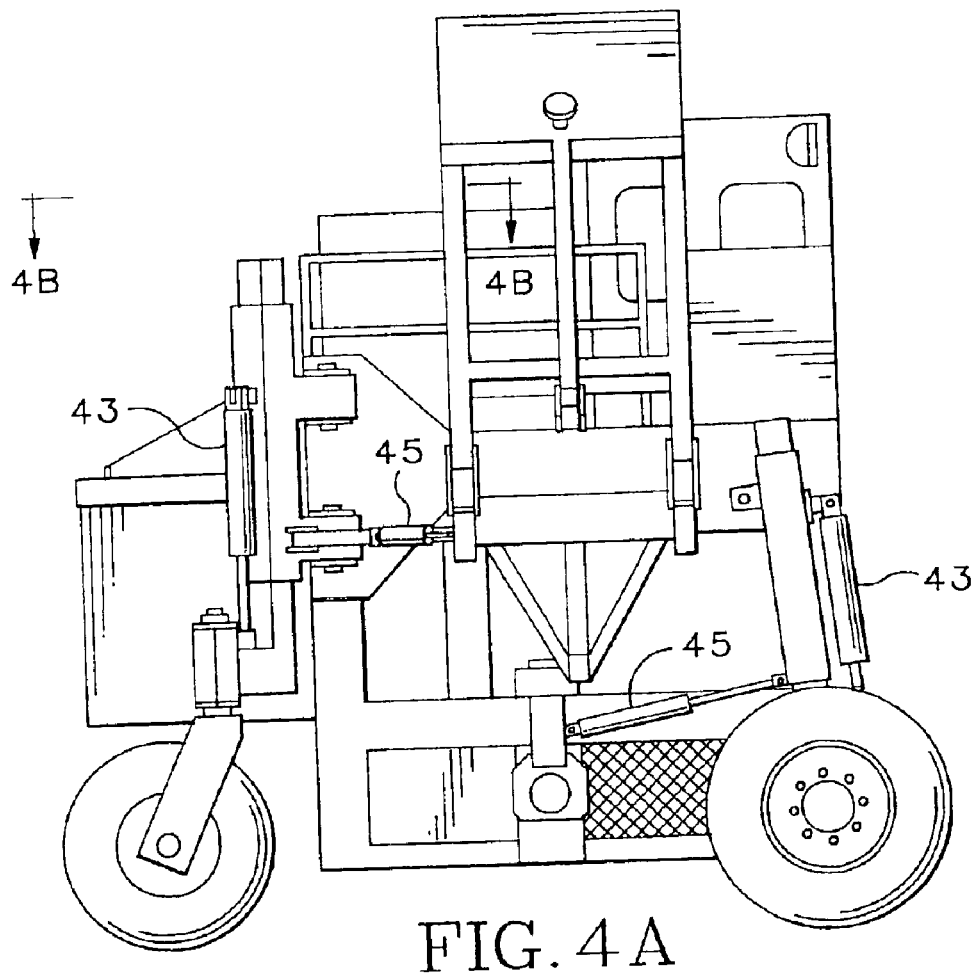
Figure 4B:
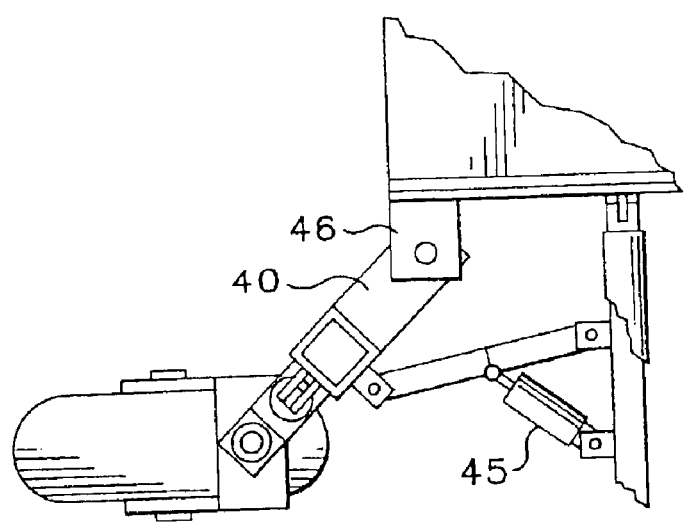

An alternative design for the wheel frame assemblies 40 is shown in FIGS. 4A and 4B. Note that in the alternative frame assembly design for drive wheels 14 and 16, frame assembly 40 does not pivot, but rather is moved rearward by hydraulic cylinder 45 and raised up by hydraulic cylinder 43 to its stowed position.

Figure 5:
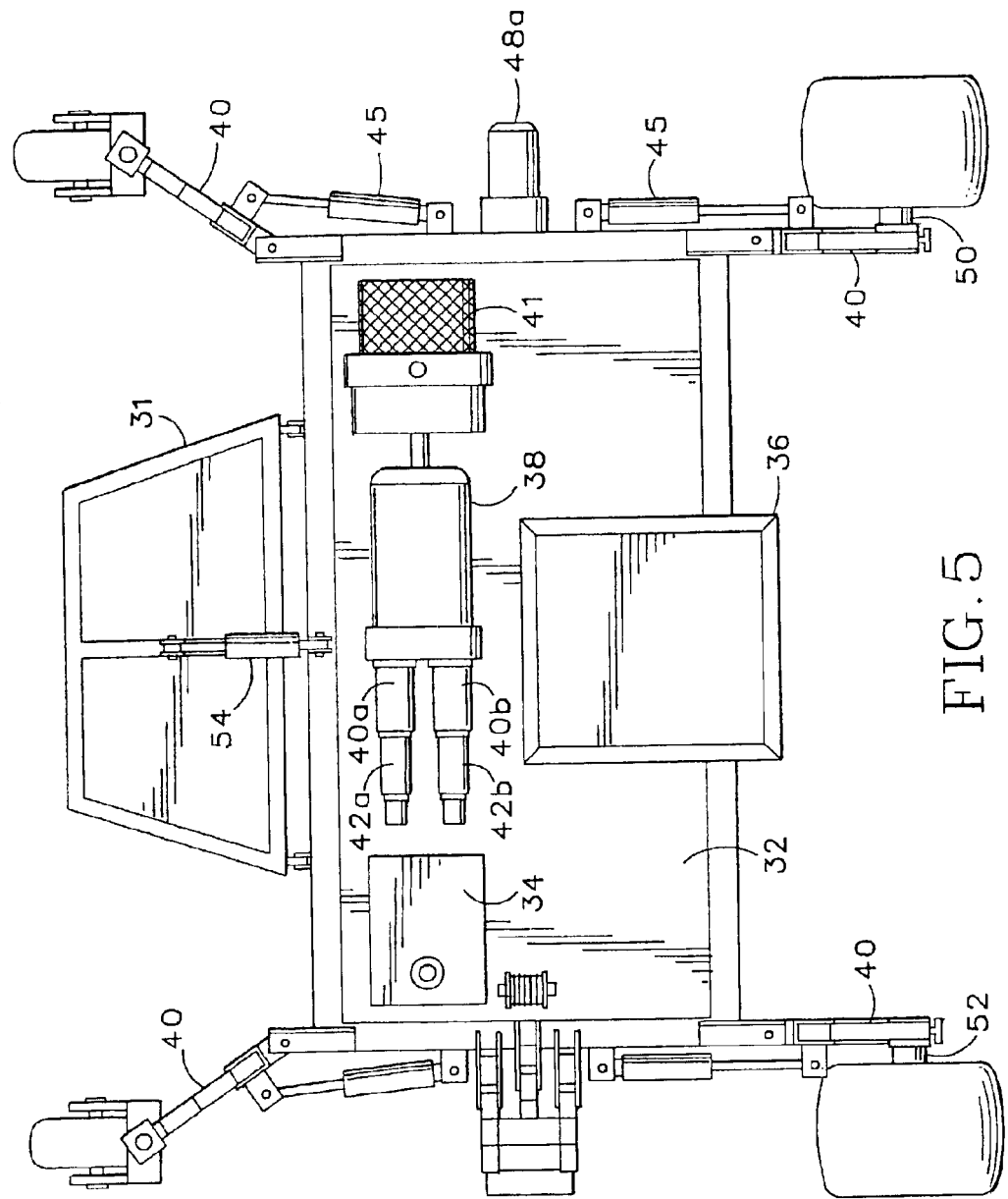
FIG. 5A is a top view of an alternative embodiment of an apparatus according to the present invention.

As best seen by reference to FIG. 5, frame 12 includes upper deck 32 on which are mounted fuel tank 34, operator's cab 36, hydraulic oil tank 37, engine 38, and hydraulic pumps 40, 42 and 44. As readily appreciated by those skilled in the art, suitable auxiliary equipment for operation of the engine and drive components in dusty environments is also provided, such as rotating self-cleaning screen 41 of the cooling system of engine 38. Power for the operation of apparatus 10 is provided by hydraulic pumps 40, 42 and 44, which are driven by engine 38, preferably a 460 hp diesel engine such as Model 3406, manufactured by Caterpillar. Each hydraulic pump 40a and 40b delivers pressurized hydraulic fluid to each of drum assembly drive motors 48a and 48b to reversibly drive rotating drum and paddle assembly 22 from each end. Hydraulic pumps 42a and 42b deliver pressurized hydraulic fluid to left and right drive motors 50 and 52 respectively. Pump 44a delivers pressurized fluid to hydraulic cylinders 43 for raising and lowering frame 12, while pump 44b provides pressurized fluid for operating hydraulic cylinders 45, and hydraulic cylinder 54 for raising and lowering tail section 31. Left and right drive motors 50 and 52 are separately controllable by the operator for steering and for driving left and right drive wheels 14 and 16 respectively through an appropriate drive assembly of a suitable design as could be readily determined by one skilled in the art.

In the preferred embodiment, a planetary gear assembly, Model No. W-2 as manufactured by Fairfield is used on each the left side and right side drive wheel and motor assembly. The left side planetary drive assembly differs from that of the right side only in that it is rendered free wheeling for reasons described below by operation of an external T-handle. Apparatus 10 is steerable and driveable forwardly, rearwardly, and sideways as described below by virtue of the fact that each drive wheel is driveable forwardly and rearwardly independently of the other by appropriate hydraulic controls of standard design and well-known to those skilled in the art. Each hydraulic pump 40a and 40b delivers pressurized hydraulic fluid to each of drum assembly drive motors 48a and 48b to reversibly drive rotating drum and paddle assembly 22 from each end.

Figure 5A:
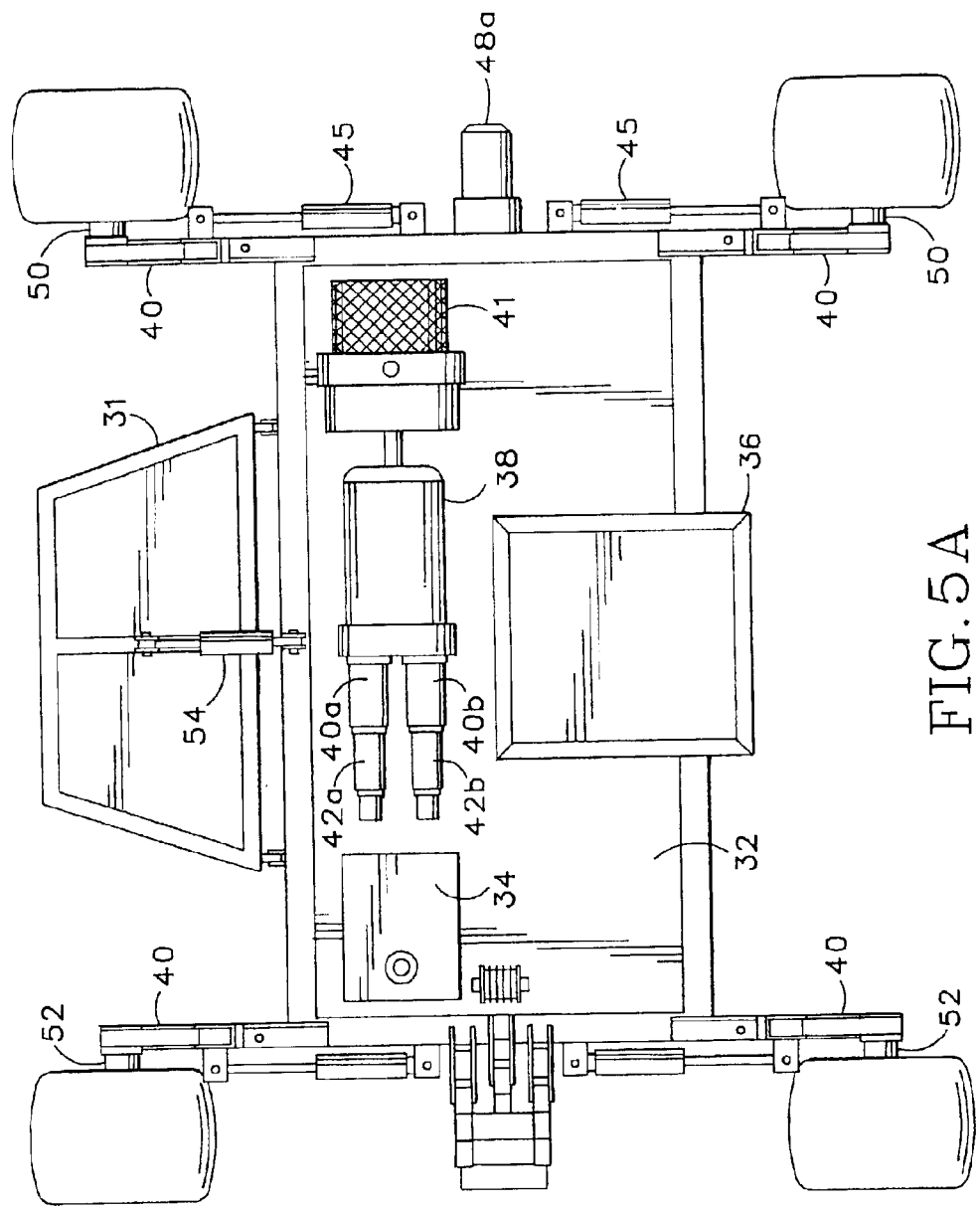

In an alternative four-wheel drive embodiment (FIG. 5A), left and right castor wheels 18 and 20 are replaced by left and right rear drive wheels 15a and 15b and respective hydraulic drive motors 51 and 53. Corresponding controls as described above with reference to the two-wheel drive embodiment are provided to allow the operator to control the speed and direction of each of the four driven wheels.

While the present invention is not intended to be defined or limited by reference to any specific dimensions, in both prior art apparatus and the present invention there is an efficiency of operation resulting from incorporation of a relatively long drum assembly, 17 feet or more for example. Accordingly, the overall width of the apparatus will be even greater than the drum length, while the overall length of the frame of the apparatus is preferably no greater than 8' 6". The overall width of the prior art apparatus prevents them from being driven through standard fence gates between adjacent fields, and requires that they be transported over public roads by truck and trailers designed for transporting heavy equipment. The present invention overcomes these limitations and cost disadvantages of the prior art apparatus by providing an apparatus which may be driven sideways under its own power through standard fence gates or over public roads for short distances, and which may be towed for longer distances over public roads when necessary. The means of configuring the present invention for so doing will now be described by reference to FIG. 5 where it can be seen that each wheel is mounted on a frame assembly 40 which is movable between a first position for accommodating forward and rearward travel of apparatus 10 during normal operation, and a second transverse position for accommodating towing or sideways travel of the apparatus. Each frame assembly 40 is moved between the first and second positions by a dedicated hydraulic cylinder 45, which is controlled by means of appropriate controls (not shown) from operator's cab 36.

Referring now to FIGS. 1 through 14, drum assembly 22 is mounted transversely within chamber 24. Chamber 24 is an open-ended housing consisting of a top wall 26, left and right side walls 28 and 30, and tail section 31 (FIG. 5). Front opening 25 is partially shrouded as shown in FIG. 1 by front drapes 33a–c. In the preferred embodiment, screened openings 23 are provided in left and right side walls 28 and 30 ahead of drum 56 to permit additional air to be drawn into chamber 24 during operation. (FIG. 3A). Tail section 31, essentially a rearwardly extending projection of chamber 24, extends rearwardly from rear opening 27. Tail section 31 may be described as a generally planar frame having rearwardly and inwardly extending side members pivotally attached to frame 12 at one end, and to lateral member at their outer ends. Drapes 39 are hung from each side member and the lateral member as best seen in FIG. 2. The drapes may be made from any suitable material.

In the present embodiment, they are fabricated from grade 2 SBR in the form of ½" thick conveyor belt material. Tail section 31 is pivotable by hydraulic cylinder 54 between a lowered operational position and a raised stowed position for use during transport of the apparatus. Rear drapes 35 are hung from each side and the rear of tail section 31 and from angled frame members defining rear opening 27 as shown. Chamber 24 serves to contain direct the air streams and contaminated material during operation of apparatus 10, and to reform the contaminated material into a windrow after mixing and aerating as more fully described below.

Drum assembly 22 is journaled at opposite ends in left and right subframes 12a and 12b. Hydraulic motors 48a and 48b are mounted on left and right subframes 12a and 12b, and reversibly drive drum assembly 22 by means of shafts 49a and 49b when supplied with pressurized hydraulic fluid from hydraulic pumps 40a and 40b as described above.

Figure 19:
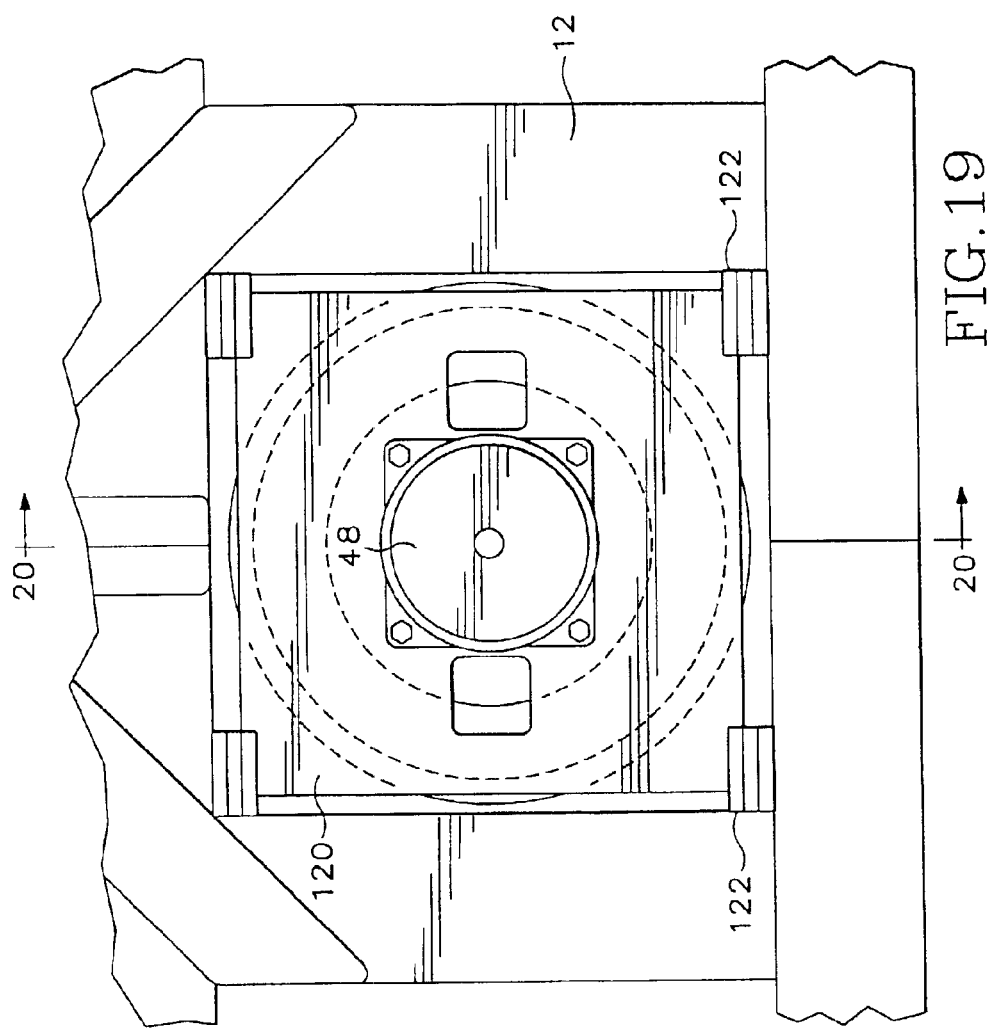
FIG. 19 is a partial side view of an apparatus showing the drum drive motor mounted on a torque plate.
Figure 20:
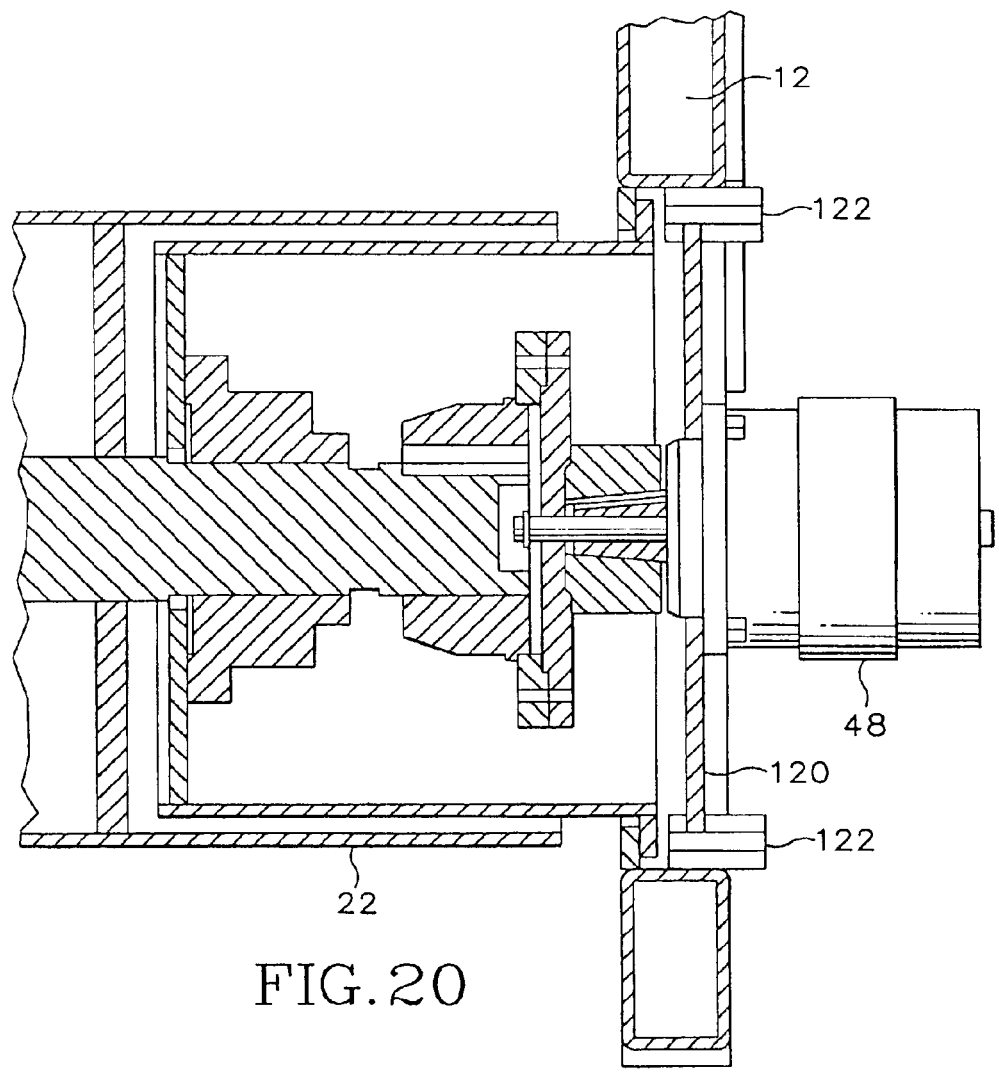
FIG. 20 is a sectional view along line A—A in FIG. 19.

Alternatively, motors 48a and 49b are each mounted on a torque plate 120 (FIGS. 19, 20), which has notched corners as best seen in FIG. 19. Torque plate is fitted into a corresponding opening 121 in frame 12. Rubber plates 122 are fitted into the notched corners between the torque plate and frame 12 to provide cushioning. As the motor is activated, torque plate 120 rotates in response to the reaction torque generated thereby. In addition, this mounting arrangement accommodates a certain amount of radial and axial movement of the drum relative to the frame.

Drum assembly 22 includes drum 56, a hollow cylinder having closed ends, onto which are welded shafts 57a and 57b (not shown). Shafts 57a and 57b are journaled into frame 12, and driveably connected with drum assembly drive motors 48 as described above. Each of shafts 57a and 57b are journaled into its respective subframe by means of a four bolt flange-type tapered roller bearing 91 such as Model FB 900 manufactured by Browning Company. Each bearing 91 is fitted into a corresponding hole in left and right subframes 12a and 12b. A split ring collar 92 is fitted into circumferential recesses 96 on each of shafts 57a and 57b, and bears against the protruding rotating race 94 of the tapered roller bearing to counteract spreading forces exerted on subframes 12a and 12b. Drum 56 thereby functions as a tension member in frame 12 counteracting spreading forces represented in FIG. 7A by force arrows 102a and 102b. This novel use of drum 56 as a tension member saves the weight of additional structural members which would otherwise be required to counteract spreading forces on subframes 12a and 12b, and allows a lower overall height which further accommodates towing the apparatus 10 on public highways.

Turning now to FIGS. 8–12, a plurality of left and right paddles 58 and 60 respectively, and center paddles 62 are mounted on the outer cylindrical surface of drum 56 as shown. In one embodiment, the paddles are arranged in four evenly spaced helical rows along the length of the drum, each row traversing 90° about the drum from one end to the other. In a second embodiment shown in FIG. 9A, the paddles are arranged in four "V-shaped" rows. The V-shaped rows of paddles serve to eliminate transverse steering torque on the apparatus which may be experienced with the use of helical rows where one end of the paddle row engages the contaminated material prior to the other. The V-shaped rows are oriented so that the paddles at each end of a row engage the contaminated material simultaneously, eliminating any steering effect resulting from paddles on one end of the drum engaging the contaminated material before the other. Additionally, the paddles of each V-shaped row are offset from those of adjacent rows to minimize bypassing of contaminated material past the drum. In one embodiment, the paddles in each row are spaced at 12" intervals. The corresponding paddles of adjacent rows are offset 3" from one another. Offsetting of the paddles in this manner promotes complete mixing and aeration since the contaminated material at every point along the entire length of drum 56 is directly in the path of at least one paddle.

Figure 9:
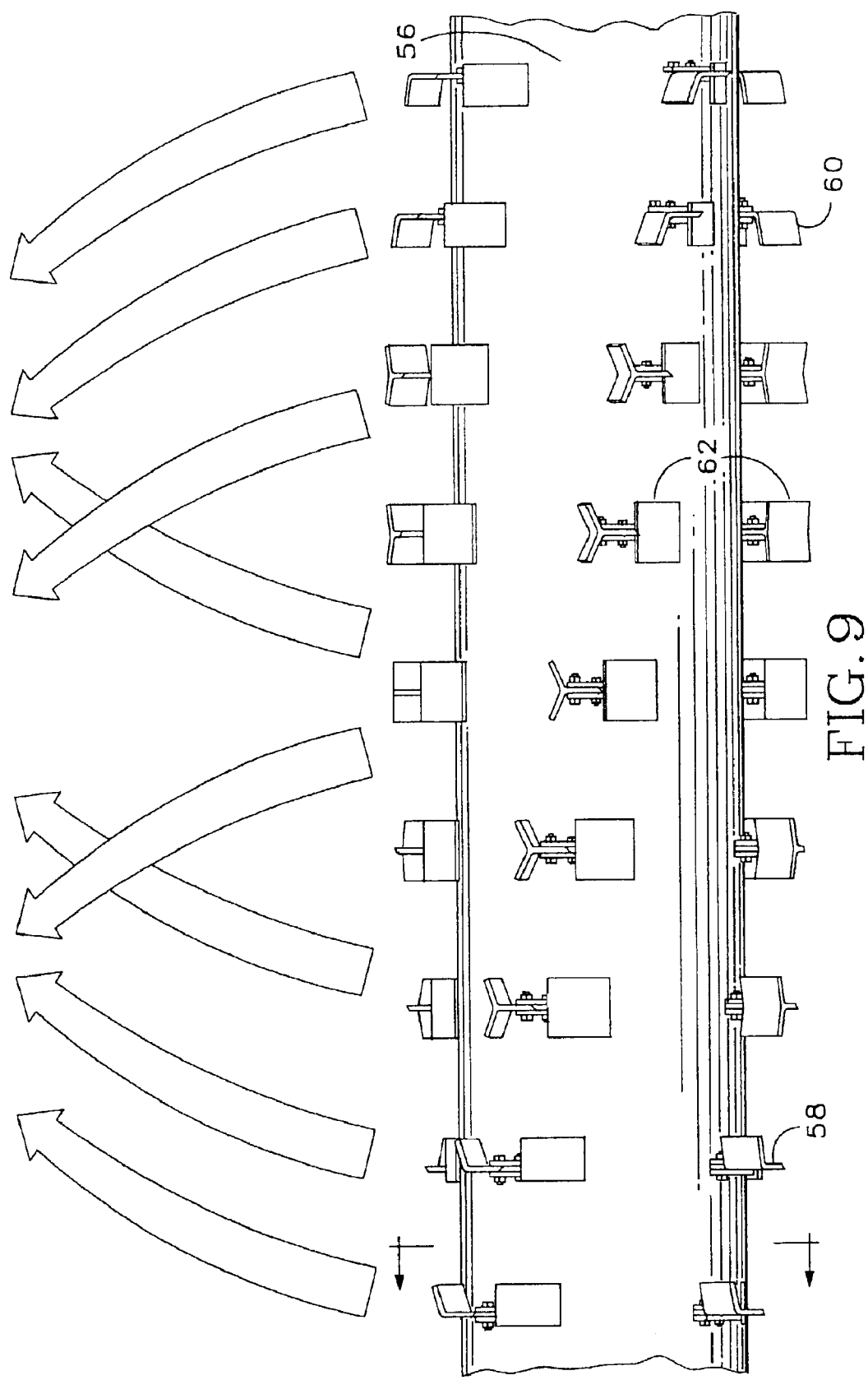
FIG. 9 is an enlarged sectional view of the center portion of the drum and paddle assembly, showing the counter-rotating vortex-like airstreams generated when the assembly is rotated.

It should be readily understood that more or less rows of paddles and different arrangements of paddles may be used. It is preferred however that left and right paddles 58 and 60 are mounted generally to the left and right of the center point of the drum respectively, while center paddles 62 are mounted along a central portion of the drum. Center paddles 62 may also be interspersed with the left and right paddles along transition portions of the drum as shown in FIG. 9. Minor variations in the number and arrangement of center paddles interspersed with left and right paddles are possible in accordance with the present invention.

Each paddle has a base section 64 by which it is pivotally attached to bracket 66, which in turn is welded to drum 56 as shown in detail in FIG. 13. Each paddle is additionally secured in position by a shear pin 68 inserted into hole 70. Shear pin 68 serves to release the paddle to pivot rearwardly if impacted by a solid object during rotation of drum assembly 22. A deflector plate 71 is attached at a rearward angle to a forward edge of bracket 66.

In a further embodiment of the present invention, each paddle has a base section 64 by which it is attached to bracket 66, which in turn is welded to drum 56 (see FIGS. 8A, 10A–13A and 13B). Each paddle is attached by two bolts 68 inserted into holes 70. Bolts 68 are designed to shear and release the paddle base section 64 if the paddle encounters an obstruction that would cause damage to the drum assembly 22 during drum rotation. Bracket 66 includes a deflector section extending forward of the paddle base attachment point as a rearward angle therefrom.

Figure 17:
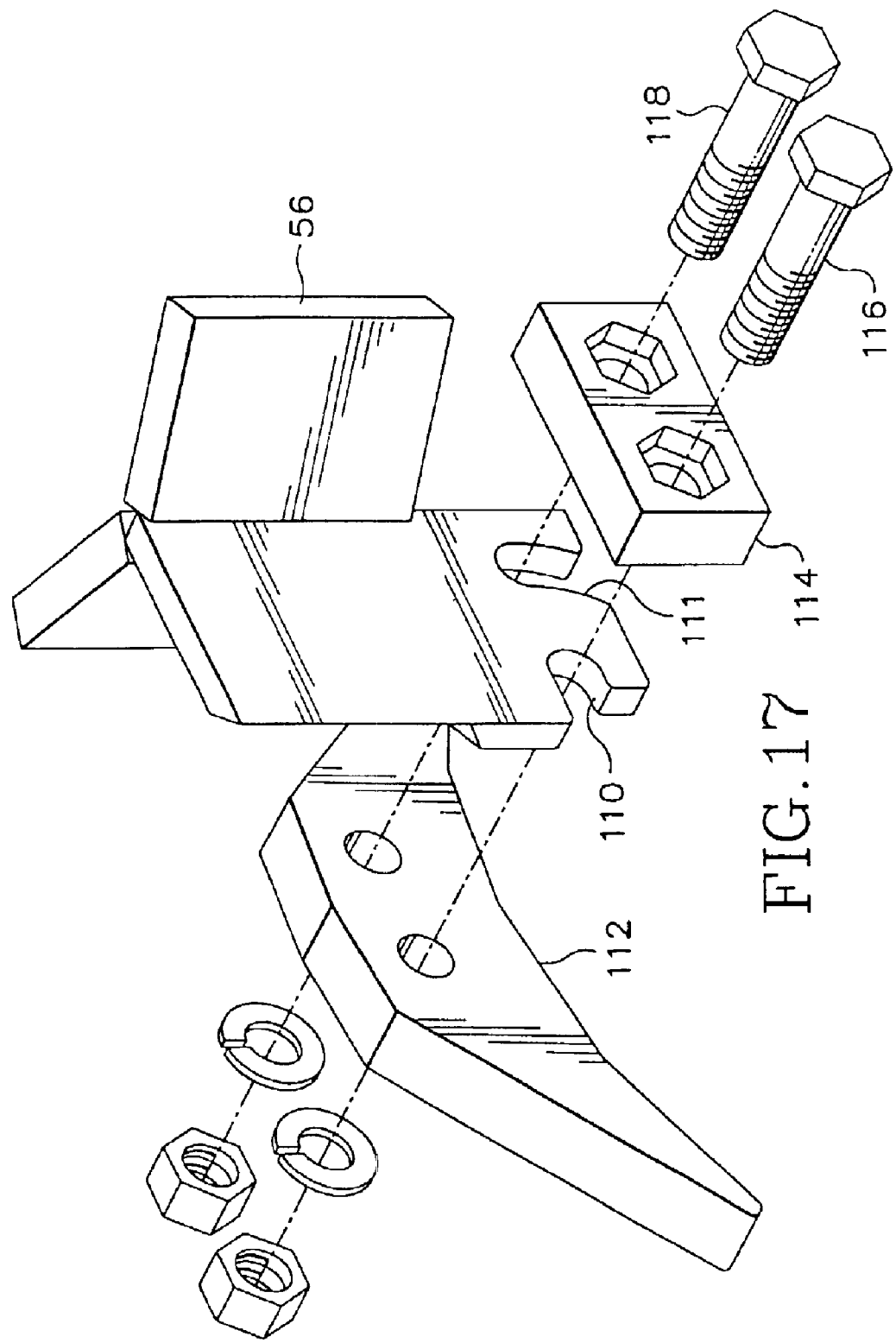
FIG. 17 is a perspective view of an alternative embodiment of the invention.
Figure 18:
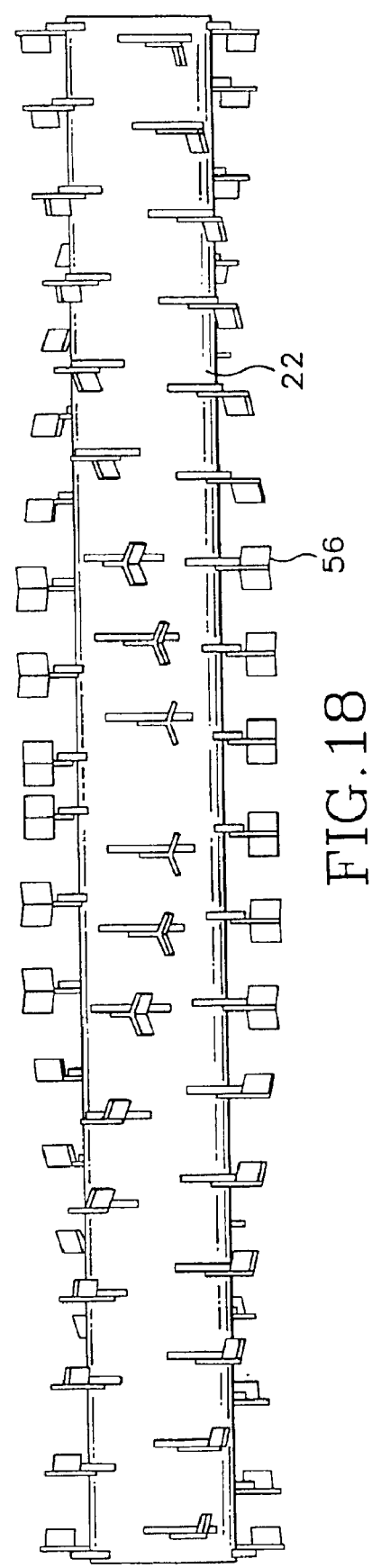
FIG. 18 is a front elevational view of a drum showing an alternative paddle arrangement wherein paddles in adjacent rows are offset.

Each paddle includes a cutting edge 72 formed on the leading edge of paddle body 74. Extending transversely from the trailing edge of left and right paddles 58 and 60 is a single paddle portion 76 extending inwardly toward the longitudinal center of drum 56. Center paddles 62 each have a pair of opposed paddle portions 78 extending outwardly toward opposite ends of drum 56. The paddle portions are preferably disposed at an angle slightly less than perpendicular relative to the paddle body. In a second embodiment (FIGS. 17, 18), one or more of the paddles include first and second slots 110, 111 in place of bolt holes. Slots 110 and 111 are preferably oriented perpendicular to one another, although other orientations are possible. The mounting assembly for paddle 56 includes bracket 112, plates 114 and nut and bolt assemblies 116 and 118. Bracket 112 is welded onto drum 56. Plate 114 is bolted to bracket 112 by bolts 116. Paddle 56 is mounted by sliding slot 110 onto bolt 116, sliding slot 112 onto bolt 118, then tightening bolts 116 and 118 to clamp paddle 56 into the assembly. Use of this mounting assembly permits paddles 56 to be quickly and easily replaced by merely loosening bolts 116 and 118, then tipping the paddle forward and sliding it out of the bracket assembly. A new paddle is then fitted in reverse order.

Each paddle portion 76 serves to generate an air stream directed upwardly of the drum and in the direction of the free end of the paddle when the drum is rotated in a direction such that the paddle travels upwardly and then rearwardly in its circular path around the drum. Stated slightly differently, the normal direction of rotation of the drum assembly is in the opposite direction of wheel rotation when the apparatus is being driven forward.

Figure 6:
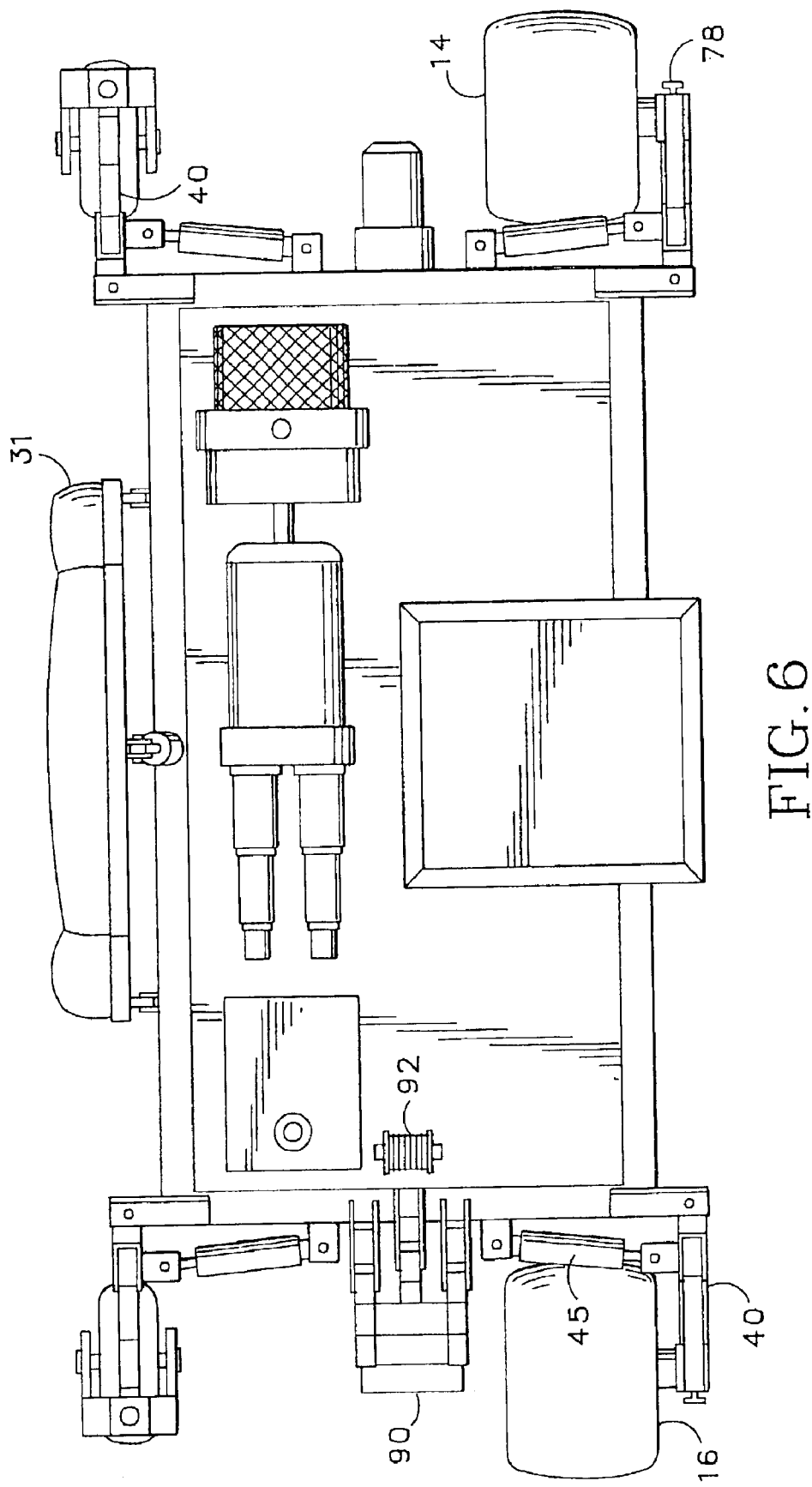
FIG. 6 is a top view of the apparatus of FIG. 1 configured for being driven sideways.

Having described the construction of the preferred embodiment, its operation will now be explained. The primary function of apparatus 10 is to shred, mix and aerate solid contaminated material. While a wide range of materials can be accommodated, the preferred embodiment is particularly suited to the contaminant of relatively light agricultural wastes such as straw and grass. Referring now to FIGS. 4 and 6, to configure the apparatus for being driven sideways, each hydraulic cylinder 43 is activated to lower frame 12 onto the ground and to raise each wheel several inches above the ground. Tail section 31 is retracted to its raised stowed position by hydraulic cylinder 54. Each frame assembly 40 is pivoted to its transverse position as shown in FIG. 6; left and right drive wheels 14 and 16 are thereby aligned transversely, as are left and right rear caster wheels. Left drive wheel 14 is then drivably disengaged from left drive motor 50 by pushing T-handle 78 inward to disengage the planetary gear drive as discussed above. Each hydraulic cylinder 43 is then activated to lower each wheel and raise frame 12 above the ground.

Apparatus 10 is now configured for being driven sideways. It is propelled in this configuration by right drive wheel 16, now facing in the direction of "forward travel", which by virtue of being fitted with flexible hydraulic supply and return lines is operable in the transverse position. Steering is accomplished by operation of hydraulic cylinder 45 to "swing" right drive wheel 16 slightly as required to adjust the direction of travel. After arriving at the desired location, the apparatus 10 is reconfigured to its contaminated mode by reversing the foregoing procedure.

If it is necessary to transport the apparatus a greater distance, other transporting configurations are provided which allow the apparatus to be flat-towed by a truck. Referring to FIGS. 3 and 4, each wheel is raised above the ground, pivoted to its transverse position, and the wheels lowered, raising frame 12 above the ground. Left drive wheel 14 is driveably disengaged as before, and left rear castor is locked against castoring action by pin assembly 19. As best seen in FIG. 7, a pair of auxiliary towing wheel assemblies 80a and 80b are then mounted on the right side of frame 12 by being inserted into channels 82a and 82b, and yokes 84a and 84b respectively, and secured therein by locking pins 86. Auxiliary towing wheel assemblies 80a and 80b are additionally secured by lateral link 86, which is pinned into bracket 88 and frame 12 as shown. Right side drive wheel 16 and right rear castor 20 are then raised to lower the right side of frame 12 onto towing wheel assemblies 80a and 80b. As shown in FIG. 2, fifth-wheel assembly 90 is an articulated, hinged frame assembly which is normally stored in a retracted position, and which is extended and locked into position as shown in FIG. 7 for being hooked to a truck (not shown) for towing apparatus 10. Fifth-wheel assembly 90 may be raised and lowered by any suitable winch assembly 92 (FIG. 6). An alternative fifth-wheel design is shown in FIG. 7A where rather than a separate towing wheel assemblies, an integral rear towing wheel assembly 81 is provided which can be raised into and lowered from its retracted position (FIG. 7A) by operation of hydraulic cylinder 83 without being detached from frame 12. Apparatus 10 thus configured may be conveniently towed over public roads with considerably less expenditure of time, effort and expense when compared to prior art apparatus. Towing the apparatus is further accommodated by the novel frame design of the present invention as shown in the figures. Drum 56 serves as a tension member interconnecting vertical subframes 12a and 12b as discussed above. The use of drum 56 as a tension member in frame 12 eliminates the need for additional structural members to resist spreading forces exerted on subframes 12a and 12b during operation and towing. Frame 12 can therefore be designed with a lower overall height to accommodate passage beneath lower bridges and overpasses. Upon arriving at its destination, towing wheel assemblies 80a and 80b are removed and apparatus is reconfigured for operation by reversing the above procedure. In the alternative embodiment, wheel assembly 81 is retracted by operation of hydraulic cylinder 83.

Prior art apparatus have proven generally unsatisfactory for processing such contaminated material due to their inability to effect adequate aeration of the materials to ensure aerobic conditions throughout the material, and due to their inability to effect adequate removal of excess moisture from the material when required. To this end, the present invention provides a novel drum and paddle assembly 22, which is, rotated at high speed in a direction opposite to that of prior art apparatus. In addition to directly impacting the contaminated material for shredding it, the rotating drum assembly 22 also draws air from ahead of the apparatus into chamber 24 and generates a high-speed stream of air in chamber 24. The high-speed air stream entrains the relatively light materials and circulates them in overlapping, counter-rotating circular patterns within chamber 24 for thoroughly aerating and mixing them. The entrained materials are suspended and circulated in the air streams, and then redeposited in a windrow to the rear of the rotating drum. As a further advantage, after mixing and aerating the contaminated materials as described, the present invention redeposits the materials in a relatively tall, more squared-off windrow having a higher volume of materials per unit of surface area than known apparatus.

To begin a contaminated operation, engine 38 is started, and drum drive motors 48a and 48b are engaged to counter-rotate drum assembly 22, preferably at approximately 550 RPMs. apparatus 10 is now raised or lowered to a desired ground clearance by activation of hydraulic cylinders 43. By so doing, apparatus 10 can be adjusted to process more or less material. This unique ability of the present invention allows for a more efficient operation by permitting greater volumes of material to be formed into a single windrow and processed in a single pass, resulting in more efficient use of the available ground area, and less processing time for a given amount of material. The height adjusting ability is additionally useful in that as the process partially decomposes the windrow of material, the volume of material decreases. The present invention allows the operator to readily adjust for the volume decrease without any decrease in the effectiveness of mixing and aeration.

Having selected the appropriate height, the operator now drives apparatus 10 forward to engage the contaminated material. As the apparatus engages and proceeds along the windrow, the contaminated material is mixed and aerated by the action of the counter-rotating drum assembly. We define counter-rotation to mean rotation in a counterclockwise direction when viewed from the right end of the drum assembly, or stated slightly differently, in the opposite direction of rotation of forward rolling drive wheels 14 and 16. Counter-rotating drum assembly draws air into chamber 24 from ahead of the apparatus in the form of an upwardly and rearwardly directed air stream ahead of the drum assembly, providing significant advantages as will be further explained. As apparatus 10 approaches, the upwardly flowing air stream first engages the windrow ahead of the drum assembly and entrains a portion of the material which travels in the air stream and which does not directly engage the counter-rotating drum assembly. Counter-rotating drum assembly 22 then engages the remaining material which is deflected by deflector plate 71 toward cutting edge 72, where the material is shredded, and then entrained in the air stream. While the precise amounts of material shredded in each pass of the apparatus are not known with certainty, in the processing of grass straw, for example, 3–4 passes through the contaminated material will normally produce a thoroughly shredded contaminated material.

Under certain operating conditions, particularly when processing heavier materials, drum 30 can be slowed and even stalled. Owing to the hydraulic coupling between the drum and engine, stalling of the drum can stall the engine as well. In the preferred embodiment, this problem is addressed by monitoring the engine speed to detect slowing of the drum, and reducing power to the drive wheels when slowing of the drum is detected. Reducing power to the drive wheels slows the forward progress of the apparatus through the windrow, thereby reducing the load on the drum and allowing it to resume its normal operating speed. In the preferred embodiment, the power to the drive wheels is first reduced by to 50% or normal, and if after no more than a few seconds the drum has not resumed its normal operating speed, further reducing power to the drive wheels to 30% of normal. Once the drum has resumed normal operating speed, the power to the drive wheels is increased to its normal level. In order to avoid lurching and resultant damage to the drive mechanism, applicants have found that the power to the drive wheels must be resumed gradually rather than all at once.

Figure 16:
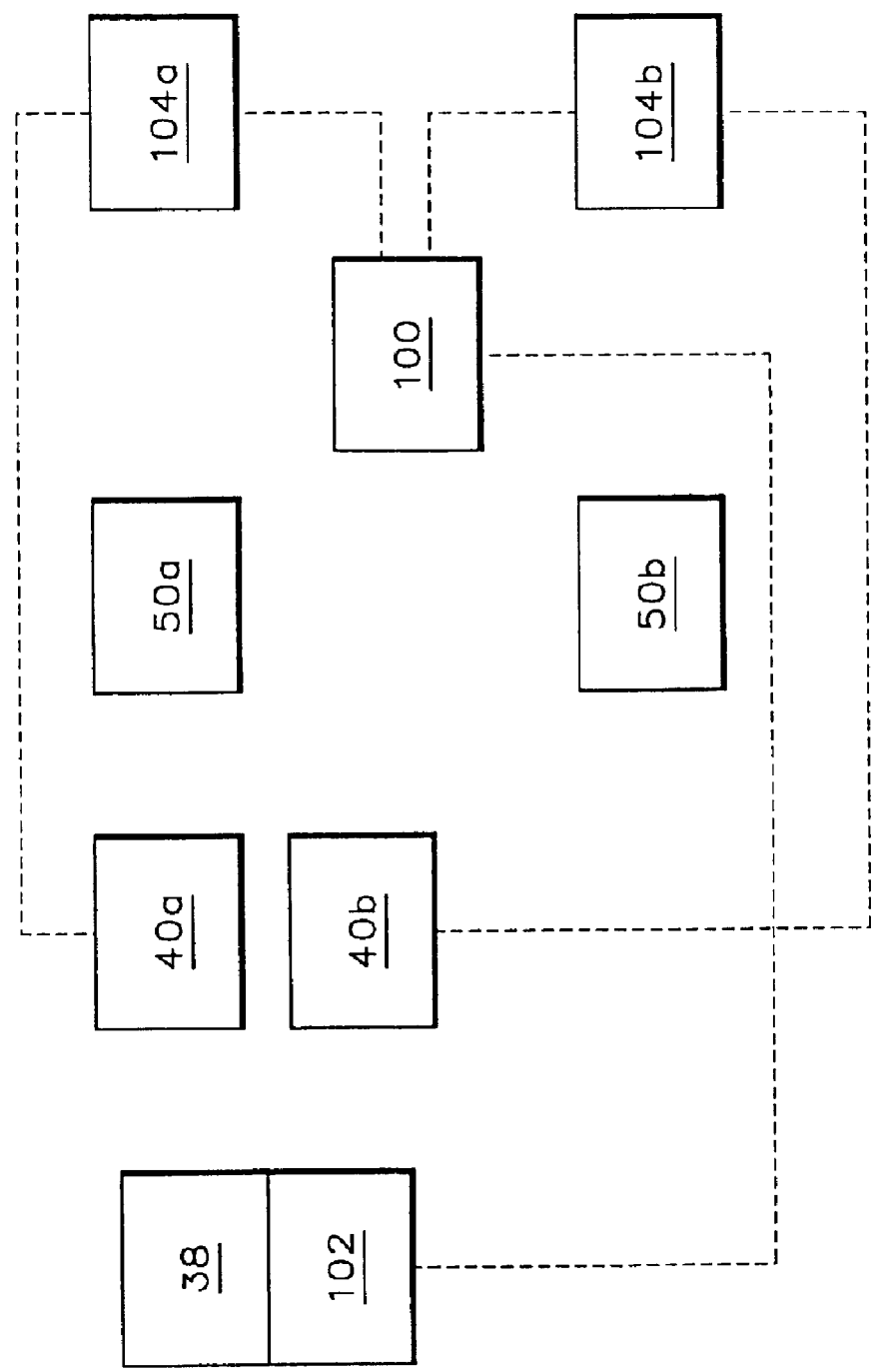
FIG. 16 is a side view of windrows formed in the treated contaminated material prior to microenfractionation.

Reducing and increasing the power to the drive wheels in response to changes in the drum speed is achieved by means of electrical control of the hydraulic pumps which provide pressurized hydraulic fluid to the left and right drive wheel hydraulic motors 42a and 42b respectively. A schematic diagram of the control system is shown in FIG. 16. A manually operated speed controller is provided for each of the two drive wheels. During normal operation, speed controllers 104a and 104b electrically control the output of hydraulic pumps 40a and 40b responsive to movement of the speed controllers by the operator. When drum 30 (not shown in FIG. 16) slows, a corresponding slowing of alternator 102 triggers a signal to controller 100, a Sundstrand Model MCH22BL1844. In response, controller 100 reduces the voltage applied to speed controllers 104a and 104b by 50%, which reduces the power to left and right drive wheel hydraulic motors 50a and 50b respectively by a corresponding amount. If within two seconds drum 30 has not resumed its normal operating speed, controller 100 further reduces the voltage to speed controllers 104a and 104b to 30% of normal. Typically, reduction of power to the drive wheels to 30% of normal has been sufficient to overcome all but the most severe stalling conditions.

Once drum 30 has resumed its normal operating speed, controller 100 restores normal voltage to speed controllers 104a and 104b and normal operation is resumed. Generally, the control system as described is so responsive that it is necessary to resume normal power to the drive wheels gradually in order to avoid lurching of the apparatus and damage to the drive train. To that end, once the drum has resumed normal operating speed controller 100 increases the voltage to speed controllers 104a and 104b gradually over several seconds.

The entrained contaminated material is propelled upwardly and rearwardly in a pair of generally rotating vortex-like airstreams. The end paddles generate air currents directed upwardly of the drum and transversely toward the center portion of the drum, while the center paddles generate an air current directed upwardly and rearwardly of, and transversely toward the ends of the drum when the drum is rotated.

The air currents generated by the end and center paddles intersect and combine to form the vortex-like, entraining air stream for mixing and aerating the windrow of contaminated material.

The airstreams overlap at their inner portions, providing repeated exchange of entrained material therebetween. As the air streams begin to lose their velocity, the contaminated material begins to drop out of the air stream and is redeposited into a windrow.

Figure 14:
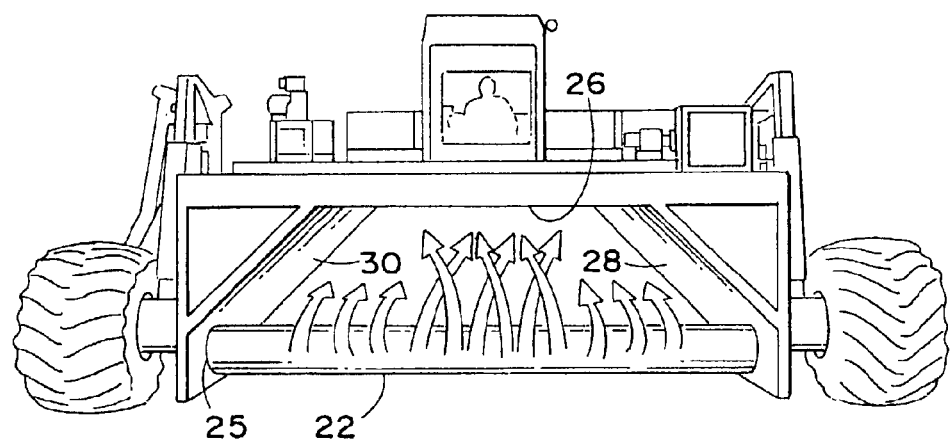
FIG. 14 is a front perspective view of a contaminated material according to the present invention, having the drapes removed to expose the chamber and drum assembly.
Figure 15:
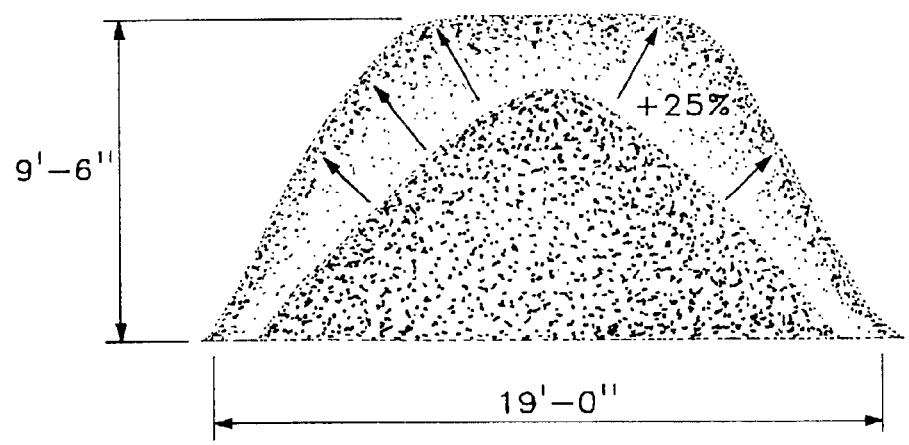
FIG. 15 is a top view of windrows formed in the treated contaminated material prior to microenfractionation.

The airstreams are generated according to the preferred embodiment by the left, right and center paddles previously described. As best seen in FIGS. 9 and 14, each row of paddles according to the present invention includes a group of paddles having paddle portions 76 facing toward opposite ends of the drum. As the drum is rotated, each paddle portion 76 draws air into chamber 24 and generates a series of airstreams flowing in the direction of the drum rotation and laterally outwardly toward the end of the drum. The series of airstreams generated by the two group of similarly oriented paddle portions 76 combine to form oppositely rotating airstreams spiraling rearwardly within chamber 24 and intersect. The interspersing of paddles having opposite facing paddle portions 76 near the center of the drum creates a region in which the oppositely rotating airstreams overlap. In the overlapping region, contaminated material is continuously exchanged between the airstreams, providing more thorough mixing of the contaminated materials than has heretofore been possible. The relatively light materials remain entrained in the airstreams for a relatively long time, until the air stream slows sufficiently to cause the material to fall from the airstream. In this way, the contaminated material is afforded an extended contact time for aeration and drying. As the airstreams spiral rearward, they exit chamber 24 through rear opening 27 and rear tail portion 31. Rear drapes 35 serve to limit the rearward travel of the airstreams and any entrained or thrown contaminated materials. Applicants have discovered that the mixing and aerating effectiveness of the present invention is significantly enhanced by the use of tail section 31, which apparently serves to promote the formation and rearward extension of the rotating airstreams, extending the contact time between the air and contaminated materials. The ability of the present invention to provide extended, interstitial aeration of relatively light contaminated materials has not been possible with prior art apparatus, and represents a significant advance in the art.

A further benefit of the present invention over prior art apparatus is related to the large volume of fresh air, which is continually drawn into chamber 24 and into intimate contact with the contaminated material. This feature is also of significant benefit when contaminated heavier materials which may not be readily entrained in the airstream, and which are mixed primarily by being thrown upwardly and rearwardly due to contact with paddle portions 76. Even so, with the large amount of air drawn into chamber 24 in the form of high-speed air streams, these heavier materials are contacted with significantly more air under more effective aerating conditions than is possible with known apparatus.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

We claim:

1. A method of producing a drum and paddle assembly for the accelerated remediation of a contaminated material which comprises:

providing at least one paddle and an elongate cylindrical drum having a longitudinal axis, each said paddle being connectable to, and extendable outwardly from the periphery of, said elongate cylindrical drum, for generating an air stream at a velocity sufficient for entraining the contaminated material therein, and for microenfractionating said contaminated material so that said contaminated material is treated with at least one chemical amendment prior to, and/or during, and/or subsequent to, microenfractionating said contaminated material, each said paddle comprising a body having a first planar portion having a leading edge and a second planar portion connected at a first angle to the first paddle portion, the second planar portion being oriented so as to generate a first material-entraining air stream when the drum is rotated, and a base portion connected to the body for mounting the paddle onto the drum; and mounting at least one said paddle onto said drum.

2. The method of claim 1, wherein said chemical amendment is a liquid.

3. The method of claim 1, wherein the contaminated material comprises a material selected from a group consisting of a polycyclic and chlorinated polycyclic, an aromatic and chloroaromatic compound, a heterocyclic and chlorinated heterocyclic compound, and an aliphatic and a chloroaliphatic compound.

4. The method of claim 1, wherein the accelerated remediation reaction is conducted aerobically, adiobatically, or methanogenically.

5. The method of claim 1, wherein said drum includes first and second end portions, and a center portion, and is rotatable about said longitudinal axis at a rotational speed.

6. The method of claim 1, wherein the contaminated material entraining air stream comprises a plurality of air currents.

7. The method of claim 1, wherein said at least one paddle comprises a third planar portion connected at a second angle to the first paddle portion, the third planar portion adapted to generate a second material-entraining air stream.

8. The method of claim 1, wherein the base portion includes at least one hole, each hole provided for receiving a connector for attaching at least one said paddle to said drum.

9. The method of claim 1, wherein the treated contaminated material entraining air stream comprises a plurality of intersecting air currents, each of the intersecting air currents having a sufficient velocity for entraining and transporting a portion of the contaminated material.

10. The method of claim 1, wherein the contaminated material entraining air stream comprises a vortex-type air stream which transports the entrained contaminated material in a generally circular path.

11. The method of claim 1, wherein the step of microenfractionating the contaminated material increases the surface area of said contaminated material by a factor of at least about 1×10.

12. The method of claim 1, wherein at least about 70% of a total amount of contaminated material is remediated within 120 days of treating the treated contaminated material with the chemical amendment.

13. The method of claim 1, wherein said at least one paddle comprises a third planar portion connected at a second angle to the first paddle portion, the third planar portion adapted to generate a second material-entraining air stream when the rotatable drum is rotated.

14. The method of claim 1, wherein the base portion includes a first hole for receiving a first paddle attachment bolt and a second hole for receiving a second paddle attachment bolt.

15. The method of claim 1, wherein the base portion includes surfaces defining first and second slots.

16. The method of claim 15, wherein the first slot is horizontal and the second slot is vertical.

17. The method of claim 15, wherein the first and second slots are disposed at an angle relative to each other.

18. The method of claim 17, wherein the angle between the first and second slots is about 90 degrees.

19. The method of claim 1, wherein the chemical amendment comprises an aqueous solution.

20. The method of claim 1, wherein the contaminated material comprises contaminated soil, the contaminated soil comprising at least about 50% weight of clay.

* * * * *

UNITED STATES PATENT AND TRADEMARK OFFICE
CERTIFICATE OF CORRECTION

PATENT NO. : 6,893,862 B1 Page 1 of 1
APPLICATION NO. : 10/310426
DATED : May 17, 2005
INVENTOR(S) : Horn et al.

It is certified that error appears in the above-identified patent and that said Letters Patent is hereby corrected as shown below:

On the cover sheet, item 56, under U.S. Patent Documents, please replace "Woodring" with --Wooding--

On the cover sheet, item 56, under U.S. Patent Documents, please replace "Tel-or" with --Tel or--

On the cover sheet, item 56, under U.S. Patent Documents, please replace "Monlux" with --Monlus--

At column 1, line 8, replace "Nov. 20, 1998" with --Oct. 23, 2001--

At column1, line 66, replace "containing, hazardous" with --containing hazardous--

At column 3, line 53, replace "Aneed" with --A need--

At column 5, line 22, replace "period ate" with --periodate--

At column 13, line 43, replace "track hoc" with --track hoe--

At column 20, line 28, replace "effectiveness" with --effective-ness--

At column 24, line 6, replace "1 x 10" with --1 x 10'--

Signed and Sealed this

Fourteenth Day of November, 2006

JON W. DUDAS
*Director of the United States Patent and Trademark Office*